(12) United States Patent
Stratton et al.

(10) Patent No.: US 9,338,064 B2
(45) Date of Patent: May 10, 2016

(54) SYSTEM AND METHOD FOR MANAGING A COMPUTING CLUSTER

(71) Applicant: Twilio, Inc., San Francisco, CA (US)

(72) Inventors: Frank Stratton, San Francisco, CA (US); Thomas Wilsher, San Francisco, CA (US); Cheuk To Law, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 453 days.

(21) Appl. No.: 13/743,660

(22) Filed: Jan. 17, 2013

(65) Prior Publication Data

US 2013/0132553 A1 May 23, 2013

Related U.S. Application Data

(63) Continuation-in-part of application No. 13/167,562, filed on Jun. 23, 2011.

(60) Provisional application No. 61/357,938, filed on Jun. 23, 2010.

(51) Int. Cl.
*G06F 13/00* (2006.01)
*H04L 12/24* (2006.01)
(Continued)

(52) U.S. Cl.
CPC .............. *H04L 41/50* (2013.01); *G06F 9/5072* (2013.01); *G06F 11/076* (2013.01); *G06F 11/0709* (2013.01); *G06F 11/3006* (2013.01); *G06F 11/3055* (2013.01); *G06F 11/3409* (2013.01)

(58) Field of Classification Search
CPC ............... G06F 8/68; G06F 8/67; G06F 8/65; G06F 8/60; G06F 8/00; G06F 11/0778; G06F 9/5072; G06F 11/06; G06F 11/076; G06F 11/0709; G06F 11/3006; G06F 11/3055; G06F 11/3409; H04L 41/5038; H04L 29/06; H04L 29/08072; H04L 29/08981; H04L 41/0806; H04L 41/12; H04L 41/50
USPC ........................................................ 709/220
See application file for complete search history.

(56) References Cited

U.S. PATENT DOCUMENTS 5,274,700 A 12/1993 Gechter et al.
5,526,416 A 6/1996 Dezonno et al.
(Continued)

FOREIGN PATENT DOCUMENTS

DE 1684587 A 3/1971
EP 0282126 A 9/1988
(Continued)

OTHER PUBLICATIONS

RFC 3986: Uniform Resource Identifier (URI): Generic Syntax; T. Berners-Lee, R. Fielding, L. Masinter; Jan. 2005; The Internet Society.

(Continued)

*Primary Examiner* — Robert B Harrell
(74) *Attorney, Agent, or Firm* — Jeffrey Schox

(57) ABSTRACT

A system and method that includes managing a computer cluster with a plurality of machines of a first version in an active configuration; adding at least one machine of a second version to the computer cluster; monitoring the operational status of the machine of a second version; and transitioning the computer cluster to use the machine of a second version in an active configuration.

16 Claims, 19 Drawing Sheets

(51) Int. Cl.
  *G06F 9/50* (2006.01)
  *G06F 11/30* (2006.01)
  *G06F 11/07* (2006.01)
  *G06F 11/34* (2006.01)

(56) References Cited

U.S. PATENT DOCUMENTS

| | | | |
|---|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 6,026,440 A | 2/2000 | Shrader et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Orolin et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,614,046 B2 * | 11/2009 | Daniels et al. ............... 717/170 |

(56) References Cited

U.S. PATENT DOCUMENTS

| | | |
|---|---|---|
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,715,547 B2 | 5/2010 | Ibbotson et al. |
| 7,742,499 B1 | 6/2010 | Erskine et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |
| 8,069,096 B1 | 11/2011 | Ballaro et al. |
| 8,081,958 B2 | 12/2011 | Soderstroem et al. |
| 8,103,725 B2 | 1/2012 | Gupta et al. |
| 8,126,128 B1 | 2/2012 | Hicks, III et al. |
| 8,149,716 B2 | 4/2012 | Ramanathan et al. |
| 8,150,918 B2 | 4/2012 | Edelman et al. |
| 8,156,213 B1 * | 4/2012 | Deng et al. ................ 709/223 |
| 8,185,619 B1 | 5/2012 | Maiocco et al. |
| 8,196,133 B2 * | 6/2012 | Kakumani et al. ......... 717/172 |
| 8,233,611 B1 | 7/2012 | Zettner |
| 8,238,533 B2 | 8/2012 | Blackwell et al. |
| 8,243,889 B2 | 8/2012 | Taylor et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,326,805 B1 | 12/2012 | Arous et al. |
| 8,346,630 B1 | 1/2013 | McKeown |
| 8,355,394 B2 | 1/2013 | Taylor et al. |
| 8,417,817 B1 | 4/2013 | Jacobs |
| 8,429,827 B1 | 4/2013 | Wetzel |
| 8,438,315 B1 * | 5/2013 | Tao et al. .................... 710/8 |
| 8,462,670 B2 | 6/2013 | Chien et al. |
| 8,467,502 B2 | 6/2013 | Sureka et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,649,268 B2 | 2/2014 | Lawson et al. |
| 8,667,056 B1 | 3/2014 | Proulx et al. |
| 8,675,493 B2 | 3/2014 | Buddhikot et al. |
| 8,755,376 B2 | 6/2014 | Lawson et al. |
| 8,767,925 B2 | 7/2014 | Sureka et al. |
| 8,806,024 B1 | 8/2014 | Francis et al. |
| 8,837,465 B2 | 9/2014 | Lawson et al. |
| 8,838,707 B2 | 9/2014 | Lawson et al. |
| 8,861,510 B1 | 10/2014 | Fritz |
| 8,948,356 B2 | 2/2015 | Nowack et al. |
| 8,964,726 B2 | 2/2015 | Lawson et al. |
| 9,014,664 B2 | 4/2015 | Kim et al. |
| 9,015,702 B2 * | 4/2015 | Bhat ........................... 717/178 |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0198941 A1 | 12/2002 | Gavrilescu et al. |
| 2003/0006137 A1 | 1/2003 | Wei et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097447 A1 | 5/2003 | Johnston |
| 2003/0103620 A1 | 6/2003 | Brown et al. |
| 2003/0123640 A1 | 7/2003 | Roelle et al. |
| 2003/0195990 A1 | 10/2003 | Greenblat |
| 2003/0196076 A1 | 10/2003 | Zabarski et al. |
| 2003/0211842 A1 | 11/2003 | Kempf et al. |
| 2003/0229890 A1 * | 12/2003 | Lau et al. .................... 717/168 |
| 2003/0231647 A1 | 12/2003 | Petrovykh |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0060044 A1 * | 3/2004 | Das et al. .................... 717/171 |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0165569 A1 | 8/2004 | Sweatman et al. |
| 2004/0172482 A1 | 9/2004 | Weissman et al. |
| 2004/0205689 A1 | 10/2004 | Ellens et al. |
| 2004/0213400 A1 | 10/2004 | Golitsin et al. |
| 2004/0218748 A1 | 11/2004 | Fisher |
| 2004/0228469 A1 | 11/2004 | Andrews et al. |
| 2004/0240649 A1 | 12/2004 | Goel |
| 2005/0005200 A1 | 1/2005 | Matena et al. |
| 2005/0010483 A1 | 1/2005 | Ling |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0091572 A1 | 4/2005 | Gavrilescu et al. |
| 2005/0125251 A1 | 6/2005 | Berger et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0262494 A1 * | 11/2005 | Fung et al. .................. 717/170 |
| 2005/0289222 A1 | 12/2005 | Sahim |
| 2006/0008073 A1 | 1/2006 | Yoshizawa et al. |
| 2006/0015467 A1 | 1/2006 | Morken et al. |
| 2006/0047666 A1 | 3/2006 | Bedi et al. |
| 2006/0067506 A1 | 3/2006 | Flockhart et al. |
| 2006/0129638 A1 | 6/2006 | Deakin |
| 2006/0143007 A1 | 6/2006 | Koh et al. |
| 2006/0168334 A1 | 7/2006 | Potti et al. |
| 2006/0184930 A1 * | 8/2006 | Fuente et al. ............... 717/168 |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |

(56) References Cited

U.S. PATENT DOCUMENTS

| | | | |
|---|---|---|---|
| 2006/0222166 A1 | 10/2006 | Ramakrishna et al. | |
| 2006/0256816 A1 | 11/2006 | Yarlagadda et al. | |
| 2006/0262915 A1 | 11/2006 | Marascio et al. | |
| 2006/0270386 A1 | 11/2006 | Yu et al. | |
| 2006/0285489 A1 | 12/2006 | Francisco et al. | |
| 2007/0002744 A1 | 1/2007 | Mewhinney et al. | |
| 2007/0006217 A1* | 1/2007 | Tammana | 717/174 |
| 2007/0011328 A1* | 1/2007 | Srinivasan | 709/226 |
| 2007/0036143 A1 | 2/2007 | Alt et al. | |
| 2007/0050306 A1 | 3/2007 | McQueen | |
| 2007/0070906 A1 | 3/2007 | Thakur | |
| 2007/0070980 A1 | 3/2007 | Phelps et al. | |
| 2007/0071223 A1 | 3/2007 | Lee et al. | |
| 2007/0074174 A1 | 3/2007 | Thornton | |
| 2007/0121651 A1 | 5/2007 | Casey et al. | |
| 2007/0127691 A1 | 6/2007 | Lert | |
| 2007/0127703 A1 | 6/2007 | Siminoff | |
| 2007/0130260 A1 | 6/2007 | Weintraub et al. | |
| 2007/0133771 A1 | 6/2007 | Stifelman et al. | |
| 2007/0149166 A1 | 6/2007 | Turcotte et al. | |
| 2007/0153711 A1 | 7/2007 | Dykas et al. | |
| 2007/0167170 A1 | 7/2007 | Fitchett et al. | |
| 2007/0192629 A1 | 8/2007 | Saito | |
| 2007/0208862 A1 | 9/2007 | Fox et al. | |
| 2007/0232284 A1 | 10/2007 | Mason et al. | |
| 2007/0242626 A1 | 10/2007 | Altberg et al. | |
| 2007/0265073 A1 | 11/2007 | Novi et al. | |
| 2007/0286180 A1 | 12/2007 | Marquette et al. | |
| 2007/0291905 A1 | 12/2007 | Halliday et al. | |
| 2007/0293200 A1 | 12/2007 | Roundtree et al. | |
| 2007/0295803 A1 | 12/2007 | Levine et al. | |
| 2008/0005275 A1 | 1/2008 | Overton et al. | |
| 2008/0025320 A1 | 1/2008 | Bangalore et al. | |
| 2008/0037715 A1 | 2/2008 | Prozeniuk et al. | |
| 2008/0037746 A1 | 2/2008 | Dufrene et al. | |
| 2008/0040484 A1 | 2/2008 | Yardley | |
| 2008/0052395 A1 | 2/2008 | Wright et al. | |
| 2008/0091843 A1 | 4/2008 | Kulkarni | |
| 2008/0101571 A1 | 5/2008 | Harlow et al. | |
| 2008/0104348 A1 | 5/2008 | Kabzinski et al. | |
| 2008/0134049 A1 | 6/2008 | Gupta et al. | |
| 2008/0139166 A1 | 6/2008 | Agarwal et al. | |
| 2008/0146268 A1 | 6/2008 | Gandhi et al. | |
| 2008/0152101 A1 | 6/2008 | Griggs | |
| 2008/0154601 A1 | 6/2008 | Stifelman et al. | |
| 2008/0155029 A1 | 6/2008 | Helbling et al. | |
| 2008/0162482 A1 | 7/2008 | Ahern et al. | |
| 2008/0165708 A1 | 7/2008 | Moore et al. | |
| 2008/0177883 A1 | 7/2008 | Hanai et al. | |
| 2008/0201426 A1 | 8/2008 | Darcie | |
| 2008/0209050 A1 | 8/2008 | Li | |
| 2008/0222656 A1 | 9/2008 | Lyman | |
| 2008/0229421 A1 | 9/2008 | Hudis et al. | |
| 2008/0232574 A1 | 9/2008 | Baluja et al. | |
| 2008/0235230 A1 | 9/2008 | Maes | |
| 2008/0256224 A1 | 10/2008 | Kaji et al. | |
| 2008/0275741 A1 | 11/2008 | Loeffen | |
| 2008/0310599 A1 | 12/2008 | Purnadi et al. | |
| 2008/0313318 A1 | 12/2008 | Vermeulen et al. | |
| 2008/0316931 A1 | 12/2008 | Qiu et al. | |
| 2008/0317222 A1 | 12/2008 | Griggs et al. | |
| 2008/0317232 A1 | 12/2008 | Couse et al. | |
| 2008/0317233 A1 | 12/2008 | Rey et al. | |
| 2009/0046838 A1 | 2/2009 | Andreasson | |
| 2009/0052437 A1 | 2/2009 | Taylor et al. | |
| 2009/0052641 A1 | 2/2009 | Taylor et al. | |
| 2009/0059894 A1 | 3/2009 | Jackson et al. | |
| 2009/0063502 A1 | 3/2009 | Coimbatore et al. | |
| 2009/0074159 A1 | 3/2009 | Goldfarb et al. | |
| 2009/0075684 A1 | 3/2009 | Cheng et al. | |
| 2009/0083155 A1 | 3/2009 | Tudor et al. | |
| 2009/0089165 A1 | 4/2009 | Sweeney | |
| 2009/0089352 A1 | 4/2009 | Davis et al. | |
| 2009/0089699 A1 | 4/2009 | Saha et al. | |
| 2009/0093250 A1 | 4/2009 | Jackson et al. | |
| 2009/0113034 A1* | 4/2009 | Krishnappa et al. | 709/223 |
| 2009/0125608 A1 | 5/2009 | Werth et al. | |
| 2009/0129573 A1 | 5/2009 | Gavan et al. | |
| 2009/0136011 A1 | 5/2009 | Goel | |
| 2009/0170496 A1 | 7/2009 | Bourque | |
| 2009/0171659 A1 | 7/2009 | Pearce et al. | |
| 2009/0171669 A1 | 7/2009 | Engelsma et al. | |
| 2009/0171752 A1 | 7/2009 | Galvin et al. | |
| 2009/0182896 A1 | 7/2009 | Patterson et al. | |
| 2009/0217293 A1 | 8/2009 | Wolber et al. | |
| 2009/0220057 A1 | 9/2009 | Waters | |
| 2009/0221310 A1 | 9/2009 | Chen et al. | |
| 2009/0222341 A1 | 9/2009 | Belwadi et al. | |
| 2009/0225748 A1 | 9/2009 | Taylor | |
| 2009/0225763 A1 | 9/2009 | Forsberg et al. | |
| 2009/0232289 A1 | 9/2009 | Drucker et al. | |
| 2009/0234965 A1 | 9/2009 | Viveganandhan et al. | |
| 2009/0235349 A1 | 9/2009 | Lai et al. | |
| 2009/0252159 A1 | 10/2009 | Lawson et al. | |
| 2009/0276771 A1 | 11/2009 | Nickolov et al. | |
| 2009/0287800 A1* | 11/2009 | Chi et al. | 709/220 |
| 2009/0288012 A1 | 11/2009 | Hertel et al. | |
| 2009/0288165 A1 | 11/2009 | Qiu et al. | |
| 2009/0300194 A1 | 12/2009 | Ogasawara | |
| 2009/0307650 A1* | 12/2009 | Saraf et al. | 717/101 |
| 2009/0316687 A1 | 12/2009 | Kruppa | |
| 2009/0318112 A1 | 12/2009 | Vasten | |
| 2010/0037204 A1 | 2/2010 | Lin et al. | |
| 2010/0070424 A1 | 3/2010 | Monk | |
| 2010/0082513 A1 | 4/2010 | Liu | |
| 2010/0087215 A1 | 4/2010 | Gu et al. | |
| 2010/0088187 A1 | 4/2010 | Courtney et al. | |
| 2010/0088698 A1 | 4/2010 | Krishnamurthy | |
| 2010/0115041 A1 | 5/2010 | Hawkins et al. | |
| 2010/0142516 A1 | 6/2010 | Lawson et al. | |
| 2010/0150139 A1 | 6/2010 | Lawson et al. | |
| 2010/0153578 A1* | 6/2010 | Van Gassel et al. | 709/231 |
| 2010/0167689 A1 | 7/2010 | Sepehri-Nik et al. | |
| 2010/0188979 A1 | 7/2010 | Thubert et al. | |
| 2010/0191915 A1 | 7/2010 | Spencer | |
| 2010/0208881 A1 | 8/2010 | Kawamura | |
| 2010/0217837 A1 | 8/2010 | Ansari et al. | |
| 2010/0217982 A1 | 8/2010 | Brown et al. | |
| 2010/0232594 A1 | 9/2010 | Lawson et al. | |
| 2010/0235539 A1 | 9/2010 | Carter et al. | |
| 2010/0251329 A1 | 9/2010 | Wei | |
| 2010/0251340 A1 | 9/2010 | Martin et al. | |
| 2010/0257513 A1* | 10/2010 | Thirumalai et al. | 717/134 |
| 2010/0281108 A1 | 11/2010 | Cohen | |
| 2010/0291910 A1 | 11/2010 | Sanding et al. | |
| 2011/0029882 A1 | 2/2011 | Jaisinghani | |
| 2011/0029981 A1 | 2/2011 | Jaisinghani | |
| 2011/0053555 A1 | 3/2011 | Cai et al. | |
| 2011/0072423 A1* | 3/2011 | Fukata | 717/172 |
| 2011/0078278 A1 | 3/2011 | Cui et al. | |
| 2011/0081008 A1 | 4/2011 | Lawson et al. | |
| 2011/0083179 A1 | 4/2011 | Lawson et al. | |
| 2011/0093516 A1* | 4/2011 | Geng et al. | 707/827 |
| 2011/0096673 A1 | 4/2011 | Stevenson et al. | |
| 2011/0110366 A1 | 5/2011 | Moore et al. | |
| 2011/0131293 A1 | 6/2011 | Mori | |
| 2011/0167172 A1 | 7/2011 | Roach et al. | |
| 2011/0170505 A1 | 7/2011 | Rajasekar et al. | |
| 2011/0176537 A1 | 7/2011 | Lawson et al. | |
| 2011/0211679 A1 | 9/2011 | Mezhibovsky et al. | |
| 2011/0251921 A1 | 10/2011 | Kassaei et al. | |
| 2011/0253693 A1 | 10/2011 | Lyons et al. | |
| 2011/0255675 A1 | 10/2011 | Jasper et al. | |
| 2011/0265168 A1 | 10/2011 | Lucovsky et al. | |
| 2011/0265172 A1 | 10/2011 | Sharma et al. | |
| 2011/0267985 A1 | 11/2011 | Wilkinson et al. | |
| 2011/0274111 A1 | 11/2011 | Narasappa et al. | |
| 2011/0276892 A1 | 11/2011 | Jensen-Horne et al. | |
| 2011/0276951 A1 | 11/2011 | Jain | |
| 2011/0280390 A1 | 11/2011 | Lawson et al. | |
| 2011/0283259 A1 | 11/2011 | Lawson et al. | |
| 2011/0289126 A1 | 11/2011 | Aikas et al. | |
| 2011/0299672 A1 | 12/2011 | Chiu et al. | |
| 2011/0310902 A1 | 12/2011 | Xu | |

(56) References Cited

U.S. PATENT DOCUMENTS

| | | |
|---|---|---|
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023544 A1 | 1/2012 | Li et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0110564 A1* | 5/2012 | Ran et al. ................ 717/173 |
| 2012/0114112 A1 | 5/2012 | Rauschenberger et al. |
| 2012/0149404 A1 | 6/2012 | Beattie et al. |
| 2012/0170726 A1 | 7/2012 | Schwartz |
| 2012/0173610 A1 | 7/2012 | Bleau et al. |
| 2012/0174095 A1* | 7/2012 | Natchadalingam et al. ...... 718/1 |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0226579 A1 | 9/2012 | Ha et al. |
| 2012/0239757 A1 | 9/2012 | Firstenberg et al. |
| 2012/0254828 A1* | 10/2012 | Aiylam et al. ............. 717/104 |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0047232 A1 | 2/2013 | Tuchman et al. |
| 2013/0054684 A1 | 2/2013 | Brazier et al. |
| 2013/0058262 A1 | 3/2013 | Parreira |
| 2013/0067448 A1* | 3/2013 | Sannidhanam et al. ...... 717/169 |
| 2013/0097298 A1 | 4/2013 | Ting et al. |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2014/0064467 A1 | 3/2014 | Lawson et al. |
| 2014/0105372 A1 | 4/2014 | Nowack et al. |
| 2014/0106704 A1 | 4/2014 | Cooke et al. |
| 2014/0123187 A1 | 5/2014 | Reisman |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0274086 A1 | 9/2014 | Boerjesson et al. |
| 2014/0282473 A1* | 9/2014 | Saraf et al. ................ 717/170 |
| 2014/0355600 A1 | 12/2014 | Lawson et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0066865 A1 | 3/2015 | Yara et al. |
| 2015/0181631 A1 | 6/2015 | Lee et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02087804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

Complaint for Patent Infringement, *Telinit Technologies, LLC* v. *Twilio Inc.*, dated Oct. 12, 2012.

NPL, "API Monetization Platform", 2013.

Kim et al. "In-service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE. pp. 7060-7065. 2012.

Tran et al. "User to User adaptive routing based on QoE" ICNS 2011: The Seventh International Conference on Networking and Services. pp. 170-177. 2011.

Wu et al. "Quality Evaluation in Peer-to-Peer IPTV Services" Data Traffic and Monitoring Analysis, LNCS 7754. pp. 302-319. 2013.

\* cited by examiner

```xml
<!-- Frondend -->
<HostGroup count="5">
     <InstanceSize>c1.medium</InstanceSize>
     <Roles>
          <Role>frontend</Role>
     </Roles>
     <RequiresRunningRoles>
          <Role>db-master</Role>
          <Role>app-server</Role>
     </RequiresRunningRoles>
</HostGroup>

<!-- App Servers -->
<HostGroup count="2">
     <InstanceSize>m1.large</InstanceSize>
     <Roles>
          <Role>app-server</Role>
     </Roles>
     <RequiresRunningRoles>
          <Role>db-master</Role>
     </RequiresRunningRoles>
</HostGroup>

<!-- DB -->
<HostGroup count="1">
     <InstanceSize>m2.xlarge</InstanceSize>
     <Roles>
          <Role>db-master</Role>
     </Roles>
</HostGroup>
```

FIGURE 11

```
curl http://boxconfig.dev.twilio.com/api/hosts?status=running | xsltproc
iptables.xslt > iptables.conf
```

SYSTEM AND METHOD FOR MANAGING A COMPUTING CLUSTER

CROSS-REFERENCE TO RELATED APPLICATIONS

This application is a continuation in part of U.S. patent application Ser. No. 13/167,562, filed 23 Jun. 2011, titled "SYSTEM AND METHOD FOR MANAGING A COMPUTING CLUSTER", which claims priority to U.S. Provisional Application No. 61/357,938, filed 23 Jun. 2010, titled "SYSTEM AND METHOD FOR MANAGING A PLURALITY OF HOSTS" which are both incorporated in their entirety by this reference.

TECHNICAL FIELD

This invention relates generally to the cloud-computing field, and more specifically to a new and useful method and system for managing a computing cluster in the cloud-computing field.

BACKGROUND

There are increasingly more and more cloud-based services and platforms. While the use of cloud computing has been influential in allowing new products to be developed and built, management of a computing cluster on which the service or platform runs is still a challenge. Each machine or device in the computing cluster typically has its configuration set individually. However, changes in other machines can impact how one might configure a particular machine, and synthesizing such information is not easily accomplished. Thus, there is a need in the cloud-computing field to create a new and useful method and system for managing a computing cluster.

This invention provides such a new and useful method and system.

BRIEF DESCRIPTION OF THE FIGURES

FIG. 11 is a an exemplary configuration file for the computing cluster;

FIG. 15 is an example API command from a user to generate a firewall rule set allowing access to running hosts in the cloud;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method of a First Embodiment for Managing a Computer Cluster

Figure 1:
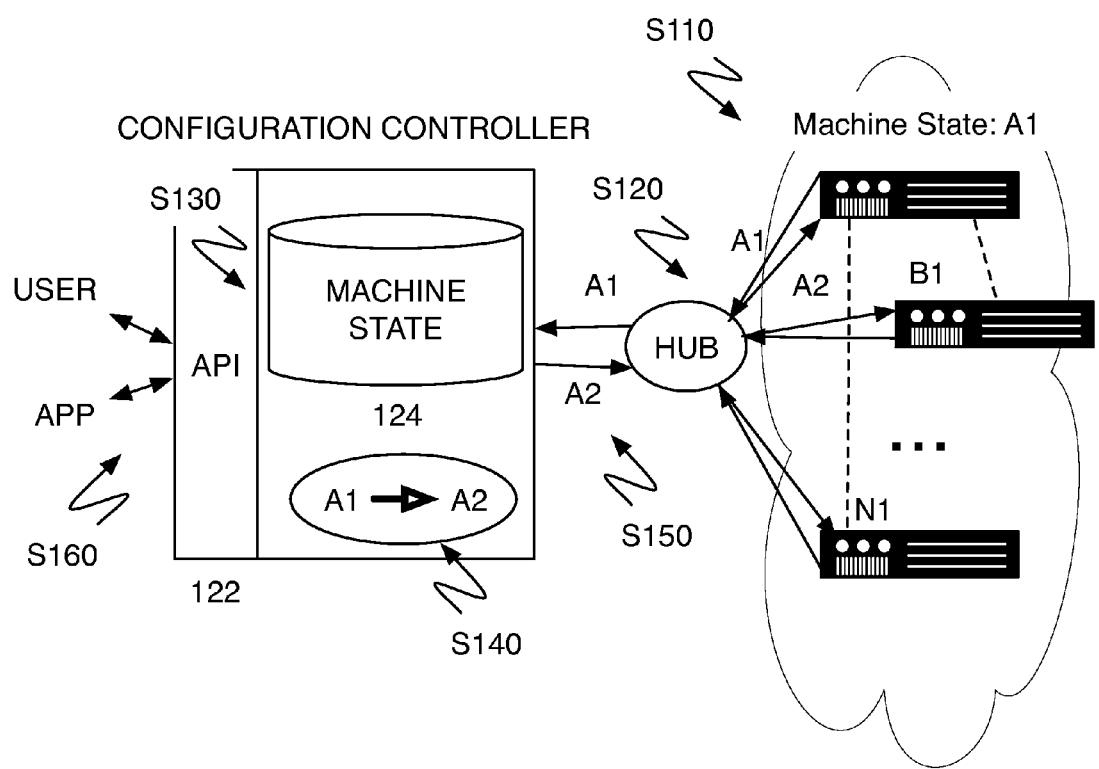
FIG. 1 is a schematic representation of a method of a preferred embodiment.

As shown in FIG. 1 a method for managing a computer cluster of a preferred embodiment includes hosting a plurality of machines in a networked computing cluster Silo, connecting the plurality of machines of the cluster to a configuration controller S120, the configuration controller storing individual machine state for the plurality of machines S130, determining a new machine state from the state of the plurality of machines S140, and updating a machine in the computing cluster with the new machine state S150. The method functions to create an interface for easy monitoring, configuration, and/or orchestration of a computing cloud. More preferably, the method enables a machine to be reconfigured based on changes in other related machines in the cloud, not just changes for that particular machine. The method is preferably implemented in a system substantially similar to the one described below but may be implemented by any suitable system. In one preferred embodiment, the method is used with a computing cluster for a telephony platform, but the computing cluster may alternatively be for any suitable application. The machines are preferably managed and operated but may alternatively be part of a third party system(s) that are simply controlled through a configuration controller. The method preferably includes pushing new machine state to a machine. These steps preferably implement a publishing and subscribing model of communication, which functions to provide real-time control over the computing cluster.

Step S110, which includes hosting a plurality of machines in a networked computing cluster, functions to operate a plurality of devices or hosts that require orchestration. The computing cluster is preferably an internet based plurality of machines (i.e., hosts), but may alternatively be an internally networked plurality of machines. The machines preferably provide computing and/or storage capabilities. A machine is preferably a server but may alternatively be any suitable dedicated device or virtual device. A machine may alternatively be a virtual machine wherein a single device facilitates running a plurality of virtual machines. A machine is preferably configured with machine state to perform a particular task. In one preferred embodiment the computing cluster is used for a telephony platform. For a telephony platform, the plurality of machines is preferably composed of call routers, load balancers, call queues, media processors, message routing devices, resource databases, and/or any additional devices. The machines may alternatively be setup for any suitable type of computing cluster. The networked computer cluster is preferably hosted by the entity administering the method, but the computer cluster may alternatively be hosted on a third party platform, or the whole of the computer cluster may alternatively be distributed over a plurality of platforms or computing clusters. The entity administering the method preferably has some level of operational control of the machines composing the computing cluster, either directly, an API of third party service, or any suitable control mechanism.

Figure 2:
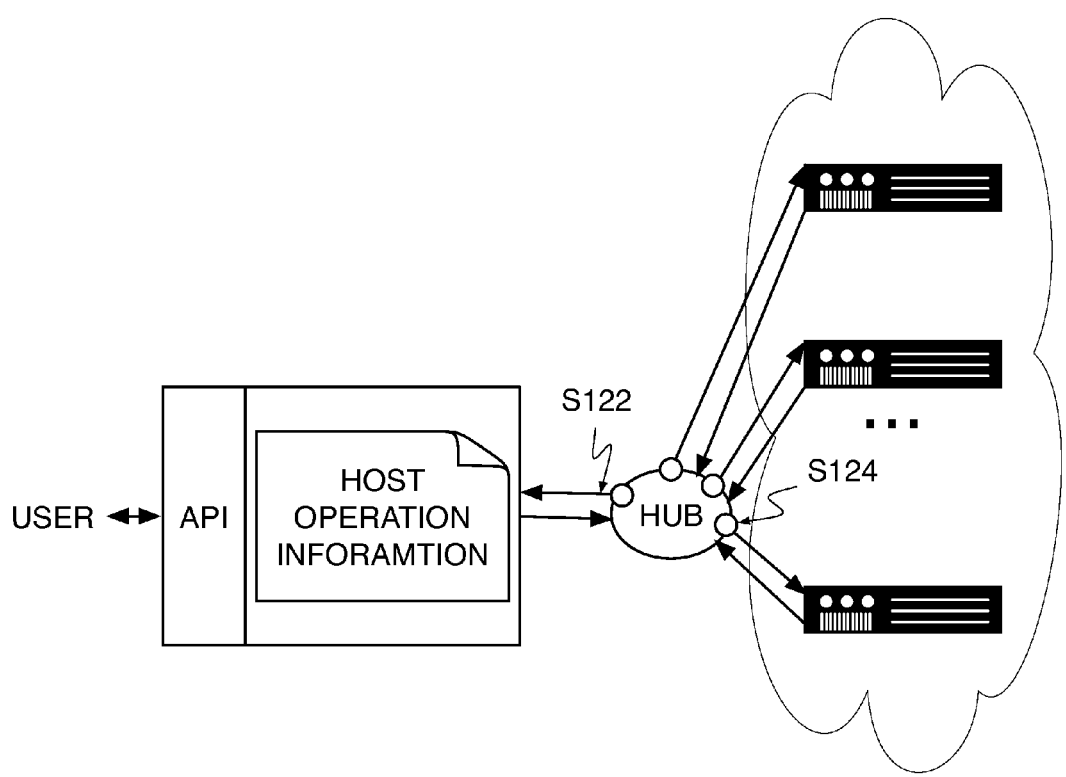
FIG. 2 is a schematic representation of a variation with publication/subscription communication of a preferred embodiment.
Figure 3:
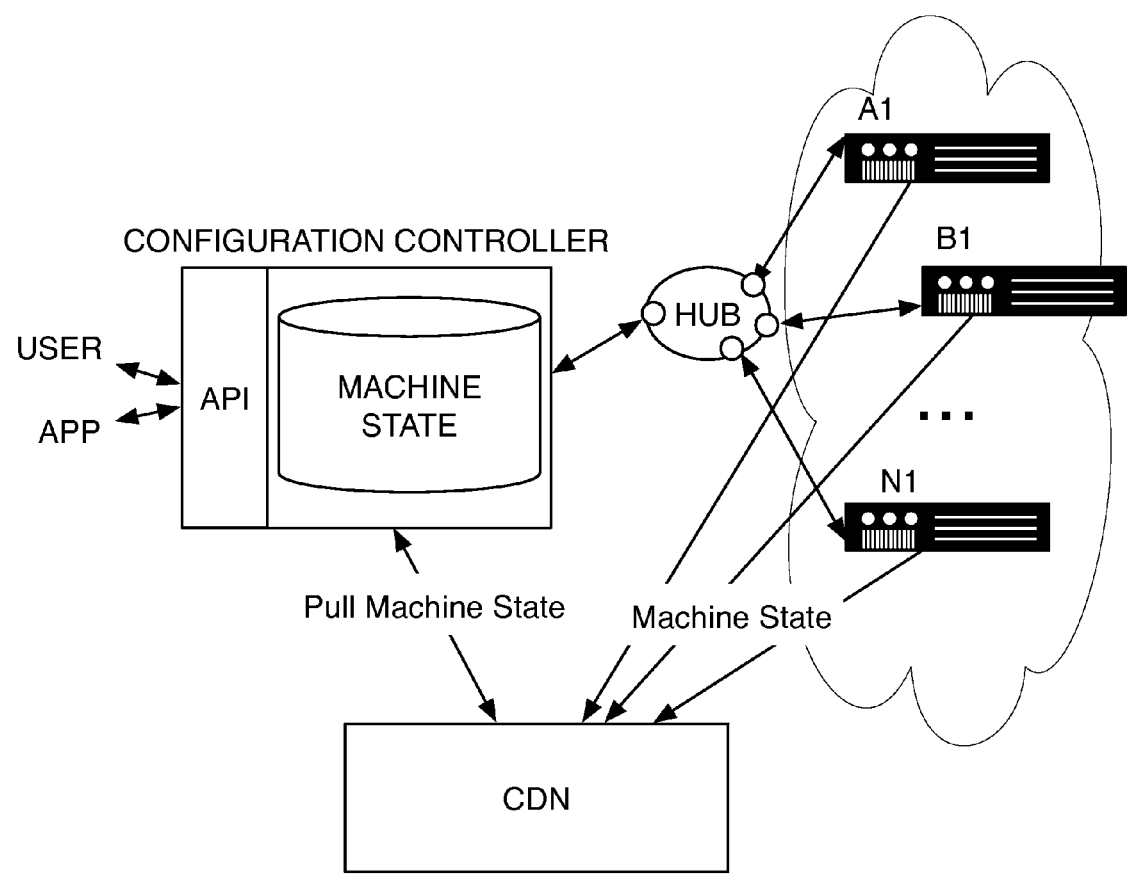
FIG. 3 is a schematic representation of a variation with content delivery network communication of a preferred embodiment.

Step S120, which includes connecting the plurality of machines of the cluster to a configuration controller, functions to create channels to send and receive messages between a central device (e.g., a configuration controller) and the devices making up a computing cluster infrastructure. The communication channels are preferably implemented through a pubsub infrastructure as shown in FIG. 2, but any suitable communication system may alternatively be used. As part of the pubsub infrastructure, Step S120 preferably includes subscribing to notifications of a plurality of machines S122 and receiving subscription requests from a plurality of machines S124. External or internal hub(s) may be used as a message broker for relaying published messaged to those who have a subscription. By subscribing to notifications of a machine, the configuration controller preferably receives operation information as the information is changed. A machine may have information actively requested from it. S122 may alternatively occur automatically, without receiving an instruction requesting the information. S122 preferably occurs whenever machine state (or operation) changes. For example, when the status of a machine changes such as due to an error, the machine preferably publishes the information, and the hub routes the information to the configuration controller because of the subscription to the machine. The configuration controller preferably maintains an updated database of machine state through such subscriptions as described in Step S130. Step S124 preferably functions to establish individual subscriptions of a machine to messages generated by the configuration controller. The configuration controller can preferably selectively publish messages to any suitable subset of the plurality of machines that have a subscription. This may be accomplished in a variety of ways. A machine may have a plurality of types of subscriptions, such as one subscription unique to messages for that machine, a subscription to messages directed to machines with a particular status, a subscription to messages directed to machines with a particular role, and/or any suitable subscription type. The subscriptions may alternatively be targeted through publication filtering. A subscription by the machine to the configuration controller preferably includes machine state. Information such as IP address (or any suitable identifier), role, status, or other operation information may additionally be communicated to the configuration controller. The machine state data of the configuration controller may be used to selectively publish information to hosts. For example, a plurality of machines may have individual subscriptions to the messages of a configuration controller. At some point in time, the configuration controller may only want to send a message to machines that have the role of a load balancer. The message is preferably only published to machines that have the role of a load balancer by filtering where the message is published. During communication data may be encrypted with a shared secret. A secret key or cryptographic code can be used to uniquely verifies communication between a machine and a configuration controller. The secret key is preferably supplied at boot time of the machine but may alternatively be established at any suitable time. The secret key is preferably included in communications between a host and the cloud manager or used to sign a communication. Any suitable authorization or security measures may alternatively be used. Other forms of communication may alternatively be used. In one variation, a content delivery network system is used as an intermediary for machine state sharing. Machines preferably post machine state to the content delivery network (CDN), and the configuration controller preferably pulls the machine state information from the CDN as shown in FIG. 3.

Figure 4A:
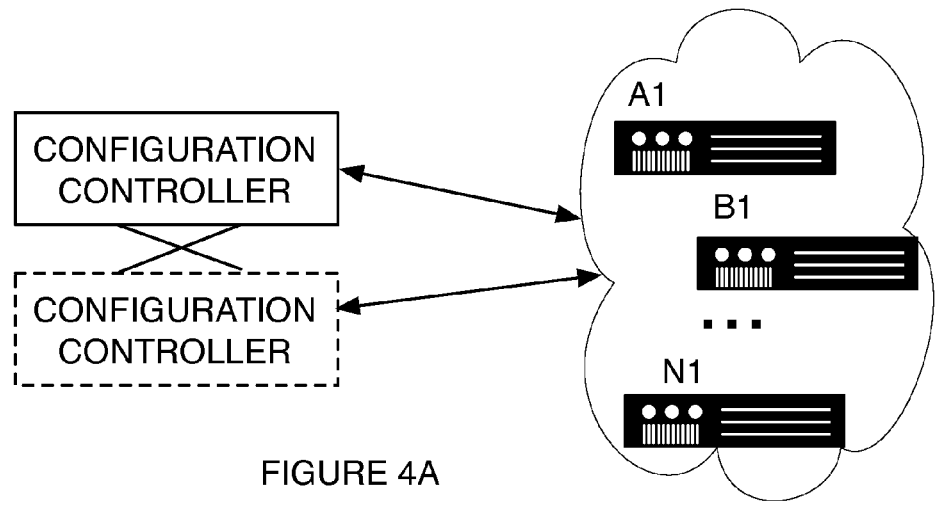
FIGS. 4A-4C are schematic representations of configuration controller architectures.
Figure 4B:
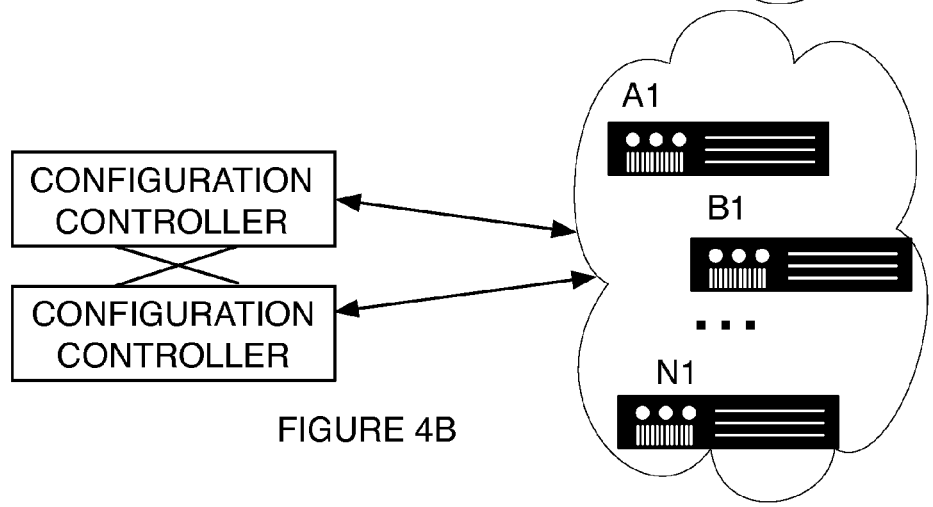
Figure 4C:
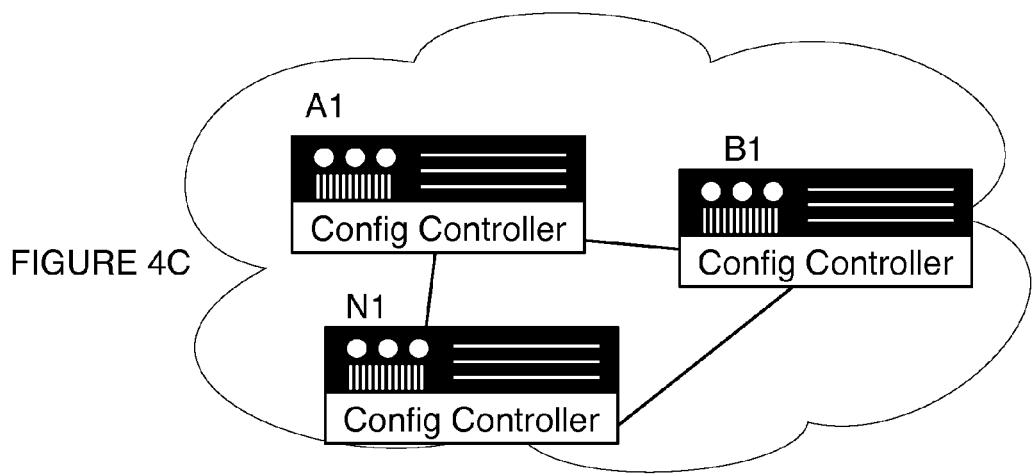

The configuration controller may have several variations of infrastructure. One preferred variation includes a single configuration controller machine integrated with the plurality of machines. A plurality of configuration controllers may additionally be used. In one variation, the configuration controller is implemented in an active-passive configuration as shown in FIG. 4A. In an active-passive configuration, one machine preferably acts as a primary configuration controller, and a second configuration controller preferably acts as a secondary configuration controller that can be used when needed. In yet another variation, the configuration controller is implemented in an active-active configuration as shown in FIG. 4B. In an active-active configuration there are a plurality of configuration controllers cooperatively managing the cluster. Machine state is preferably stored in a shared resource in this variation. In yet another variation, the machines of the cluster cooperatively function as the configuration controller in a peer-to-peer type configuration as shown in FIG. 4C. In this variation, a configuration controller service preferably runs on each machine. The configuration controller may alternatively have any suitable architecture and implementation.

Step S130, which includes the configuration controller storing individual machine state for the plurality of machines, functions to store state information for machines of the computing cluster. The configuration controller is preferably a device or platform from which computing cluster orchestration may be carried out. The configuration controller may itself be distributively hosted. Machine state of a machine preferably includes configuration data and software. The machine state may additionally include operational data. The operational data may be external to the machine. The configuration data is preferably similar to file system related data. The software is preferably the code or source code executed by the machine. The operational data is resources such as a database, media resources, persistent data, or any suitable data used in operation. The machine state may alternatively include any suitable combination of the configuration data, software, operational data, and/or other machine related data. The machines preferably publish changes in machine state to the configuration controller. Alternatively, the configuration controller may periodically poll the machines. In yet another alternative, the configuration controller pulls machine state from a CDN. The machine state is preferably stored in a database. The machine state database 124 may be any suitable database or device for storing data such as a mySQL database, JSON, or an XML file. The machine state database preferably stores a record for each machine including the machine state. This information may include internal and/or external IP addresses of the machines, status, role(s), capacity/load, and/or any suitable operation information. As discussed further below, the database may additionally store a security key for each machine to securely identify a machine. Current machine state is preferably stored, and additionally, past machine state may be stored as a version history of the machines. The version history is preferably the machine state from different points in time. These versions may be used in comparing the machine state from different times or from different machines and resolving problems.

Step S140, which includes determining a new machine state from the state of the plurality of machines, functions to calculate a next state for a machine based on overall state of the cluster. A new machine state is preferably calculated based on the current machine state. The new machine state is additionally or alternatively calculated based on the machine state of associated machines of the computing cluster. The associated machines are preferably machines that interact directly or indirectly with the machine. Machines may alternatively be associated based on shared machine state (e.g., having the same role or status). For example, two machines that are configured as indicated in the machine state to be load balancers may be associated with each other. Calculating a new machine state based on the machine state of at least a second machine enables the machines to be updated more intelligently. Additionally, a plurality of new machine states may be calculated for a plurality of machines. A new machine state may be any suitable change to a machine state. The configuration data may be changed. The software may change which may be an update to a new version of software or change in role. The operational data may change, such as changes in a database resource of a machine. In some variations, the new machine state may be a defined as provisioning a new machine to scale the computing cluster, reprovisioning a machine to a new role, restarting a machine, or deprovisioning a machine to scale down.

Figure 5:
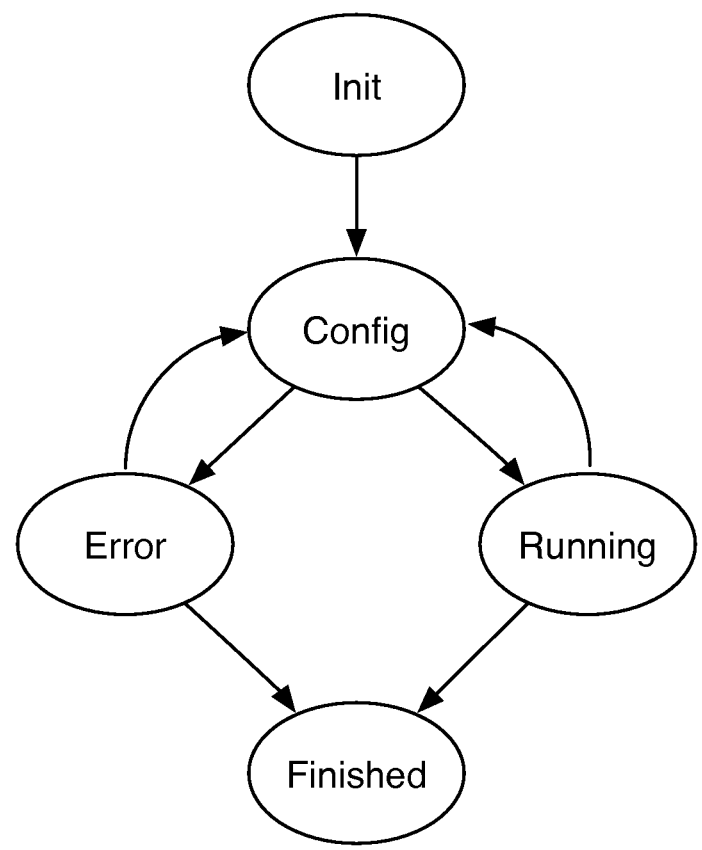
FIG. 5 is a schematic representation of a finite state machine model processed by a configuration controller of a preferred embodiment.

The calculation of a new machine state is preferably initiated by a change in the computing cluster. In one variation, calculation of a new machine state is due to the change in machine state as a result of operation. For example, if a machine encounters an error, then new machine states are preferably calculated for other machines to accommodate for the down machine. This may include provisioning a new machine with a previous machine state of the down machine, or could alternatively be a redistribution of the machines responsibilities to other machines. This transfer of responsibilities is preferably conveyed through the new machine states. Similarly the calculation of a new machine state may be due to the usage and/or capacity of the machine. Load and capacity may be communicated through the configuration data in the machine state. In another variation, calculation of a new machine state is due to outside initiation. The configuration controller preferably includes an API, which may be used by an outside system or operator. An operator may issue instructions to change elements of the computing cluster. For example, an instruction may be set to scale particular resources up or down, to update software, to change operational data, or perform any suitable orchestration instruction. The calculation of new machine state may alternatively or additionally be calculated using auto-provisioning, self healing and/or any suitable algorithm. A finite state machine may be run to determine the new machine state of a particular machine as shown in FIG. 5.

Figure 6:
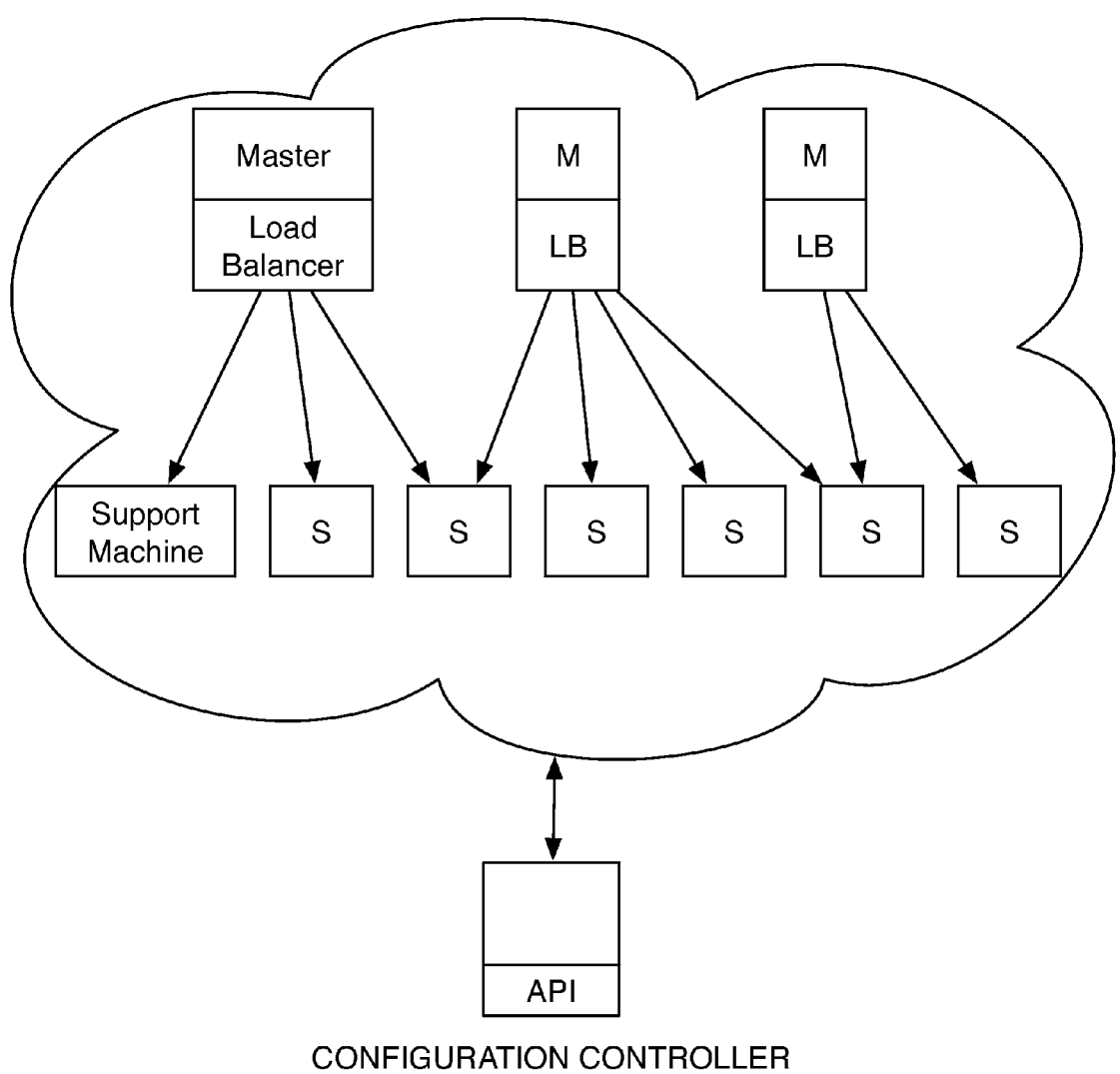
FIG. 6 is a detailed schematic representation of computing cluster including a master device and a load balancer.
Figure 7:
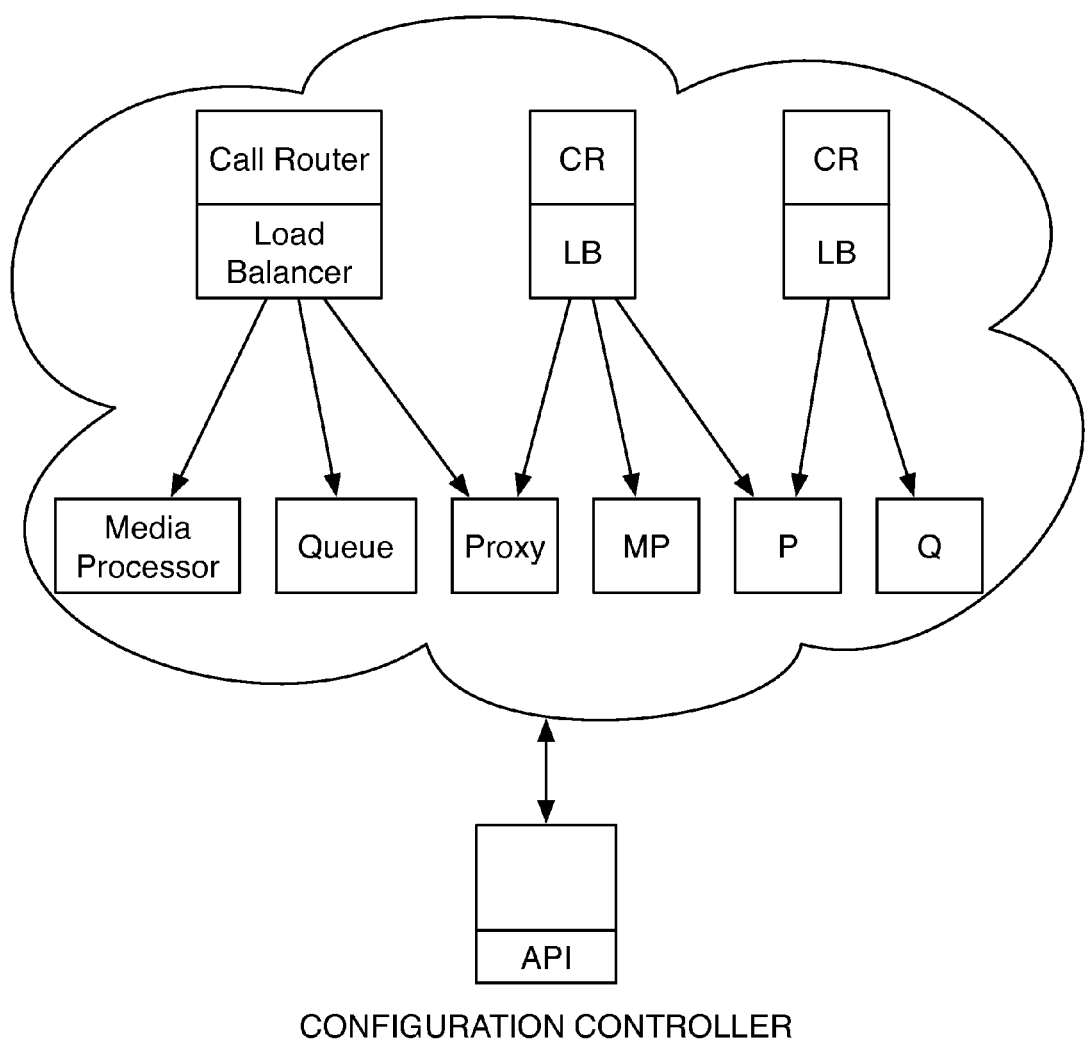
FIG. 7 is a detailed schematic representation of telephony computing cluster of a preferred embodiment.

In one variation, the machines of the computing cluster include a plurality master devices each with a dedicated load balancers as shown in FIG. 6. Having a plurality of masters and load balancers distributes responsibility and creates a more scalable computing cluster. The master device preferably provides high-level services but may serve any suitable service. In a preferred embodiment where the computing cluster is a telephony platform, the master device is preferably a call router as shown in FIG. 7. The dependent machines may be any suitable support of load balanced machines such as media processors, caches, queues, proxy servers, or any suitable machines. The dependent machines (i.e., machines managed by each load balancer) are preferably conveyed in the machine state of the load balancer. Load balancers may be configured with new machine state based on changes in the machines for which they provide load balancing. Provisioning of a machine (e.g., provisioning a new machine, deallocating a machine, etc.) that is load balanced by a particular load balancer preferably causes a recalculation of machine state for at least one load balancer. When the load balancer is updated with the new machine state the load balancer and master device may be restarted to start load balancer of the changed dependent machines.

Step S150, which includes updating a machine in the computing cluster with the new machine state, functions to set the machine to the new machine state. The new machine state is preferably communicated to the machine through the established channels of communication. The new machine state is preferably published through a hub and distributed to machines that have the appropriate subscription established in Step S124. Publications may be filtered which functions to direct the new machine state to the appropriate machine(s). As discussed above, a new machine state can preferably be selectively published (or filtered) based on any suitable machine characteristic such as IP address (or ID), status, role, capacity/load and/or any suitable aspect. Once new machine state is received at the machine, the machine may require being restarted to initialize the new machine state. Alternatively, the new machine state may be initialized during run time.

Additionally a method of the preferred embodiment includes the step of receiving a message through an API of the configuration controller S160, which functions to allow outside instructions for management of the computing cluster. The API is preferably a convenient interface for users or systems to access and change the computing cluster system. The API is preferably a RESTful API but may alternatively be any suitable API such as SOAP. Additionally, a user interface may be used as a front end control providing an alternate way for users to interact with the configuration controller through the API. The API is preferably used to alter configuration of a machine or machines. A user and/or an outside system may issue API calls. The API may additionally be used to access information about the computing cluster. The configuration controller, through the communication channels established in S120, preferably has stored and updated information about the machines. Additionally or alternatively the configuration controller may communicate with a machine requesting information. For example, an HTTP GET message using a common HTTP client tools such as curl, piped into an extensible stylesheet language transformation (XSLT) processor, can be used to generate any suitable type of configuration file. The command shown in FIG. 15 could be used with a suitable XSLT file to generate a firewall ruleset allowing access to only running hosts in the cloud. The API may alternatively be used for transferring data, allocating or reprovisioning resources, and/or any suitable cloud computing management. Additionally, a change to one machine may cause the determination of new machine state of a second machine. For example, allocating a new device may require the determination of a new machine state for a load balancer.

2. Method of a Second Embodiment for Managing a Computer Cluster

Figure 8:
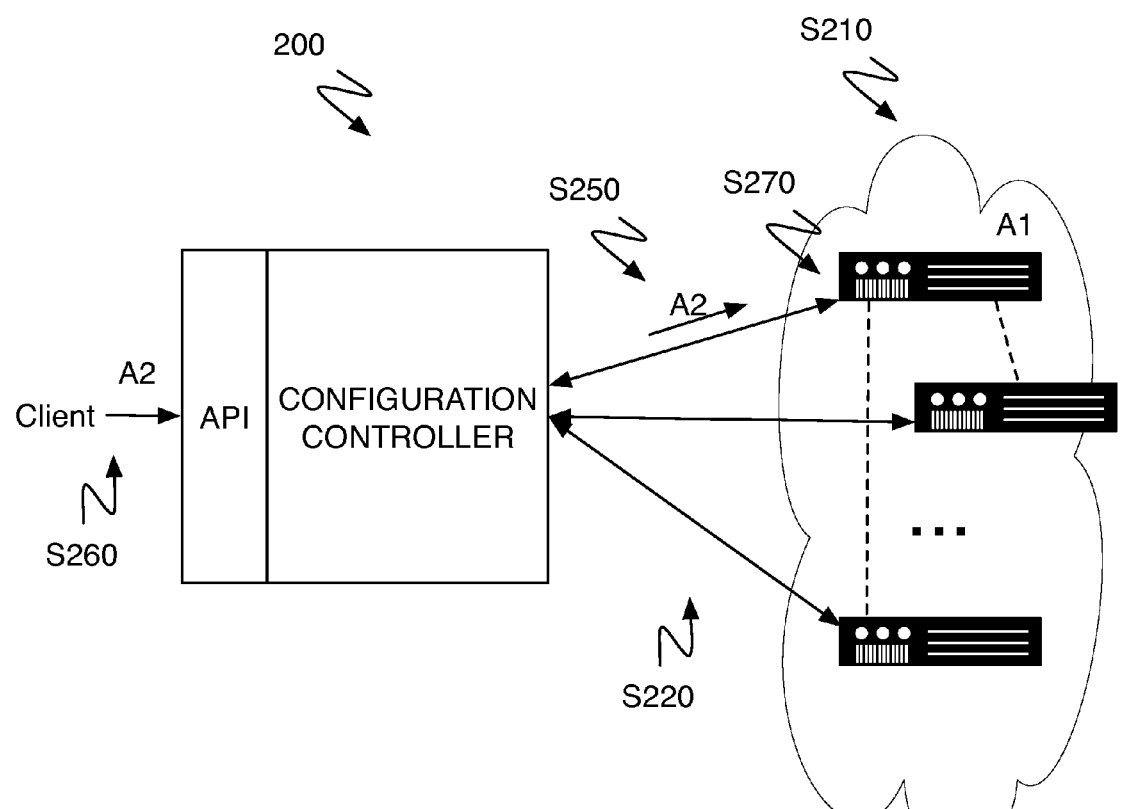
FIG. 8 is a schematic representation of a method of a second preferred embodiment.

As shown in FIG. 8, a method 200 for managing a computer cluster of a second preferred embodiment of the invention includes hosting a plurality of machines in a networked computer cluster S210; integrating a plurality of machines of the cluster with at least one configuration controller component S220; and altering the machine state of at least one service instance S250. The method functions to create an interface for easy configuration and/or orchestration of a computing cloud. The steps of the method 200 may be used in any suitable combination with the steps of method 100 above, and any of the variations of two methods may additionally be applied to either of the embodiments. Step S210, S220, and S250 is preferably substantially similar to Step S110, S120, and S150 except as noted below. Method 200 may additionally be applied to a machine or host such that multiple services of a machine may be impacted through one update.

Figure 9:
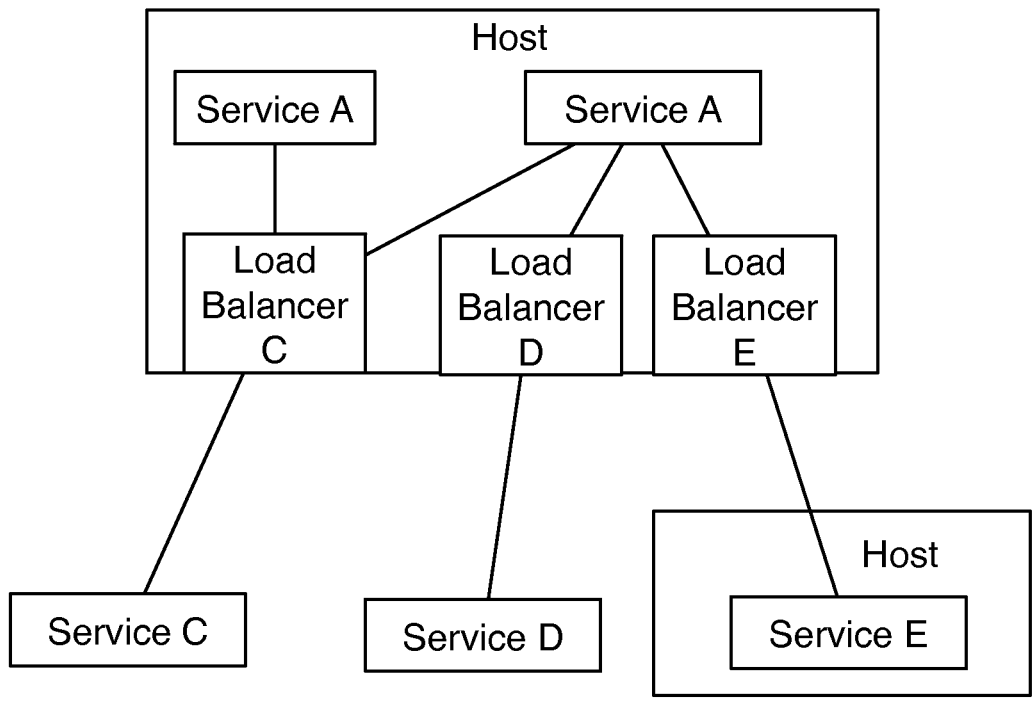
FIG. 9 is an exemplary representation of services implemented in the computing cluster.

As used in the description of method 200, a service instance preferably runs on a host. A host is preferably a machine that has one or more service instances running on the host machine. A service instance refers to a specific implementation of a service. A service preferably describes a type of module that performs a particular task or tasks within the computing cluster. For a telephony platform, the services of a computing cluster may include call routers, load balancers, call queues, media processors, message routing devices, resource databases, and/or any additional devices. In some variations, a service may be a dependent service. In other words, a first service (i.e., the dependent service) may require at least a second service. The second service may additionally be dependent on other services. The dependencies of services are preferably acyclical. A host may additionally run a load balancer for services that the hosted services depend upon as shown in FIG. 9. If multiple services of a host share a common dependency on a service, then a single load balancer may be used for that service. Each service instance preferably has machine state, but a host may additionally have machine state. As described above, machine state preferably includes configuration data and software (i.e., business logic). The machine state may additionally include operational data and/or any suitable description of the state of a service.

Figure 10:
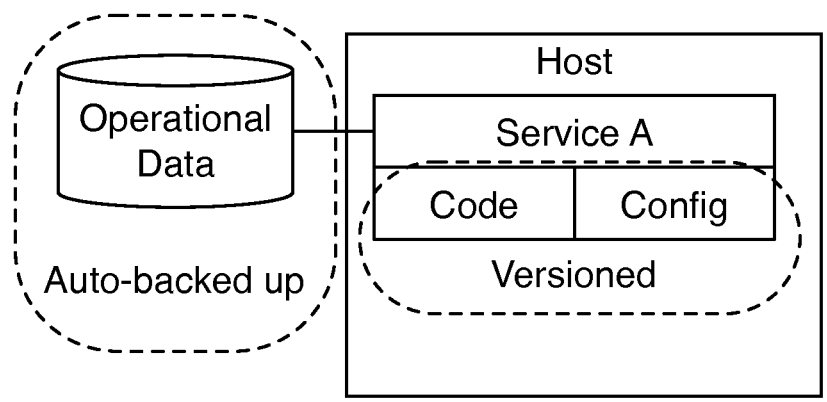
FIG. 10 is a schematic representation of machine state of a session.

Step S250, which includes updating the machine state of at least one service instance, functions to alter operation of a machine in cluster. Updating may include starting a service instance, stopping a service instance, removing a service instance, updating the version of a service instance, or reverting a version of a service, changing type of service, or any other suitable change. The update is preferably accomplished by sending a new machine state to a service instance. The machine state is preferably versioned so that the new machine state may be supplied through a version controlled version of the machine state. The software and configuration data are preferably version controlled while operational data is preferably automatically updated as shown in FIG. 10. The updating of the machine state may be initiated by an outside entity or alternatively through automatic monitoring.

One variation of the method includes receiving a specified service update S260. An API or interface may be used for users or system to supply new machine state to the configuration controller. The specified service update preferably includes at least one service to update. The update may additionally include a sub-group parameter to update a sub-group of the instances of the specified service. If sub-group parameter is note included, all instances of the specified service are preferably updated with the new machine state. The sub-group parameter may be used to update a particular instance (e.g., using an instance ID), update a fixed number, update a percentage of service instances, update a type of sub-group (e.g., service instance of a particular version number), update a services based on a combination of conditions (e.g., updating either 33% or 20 instances whichever is greater), or updated according to any suitable way of specifying a subgroup.

Figure 12:
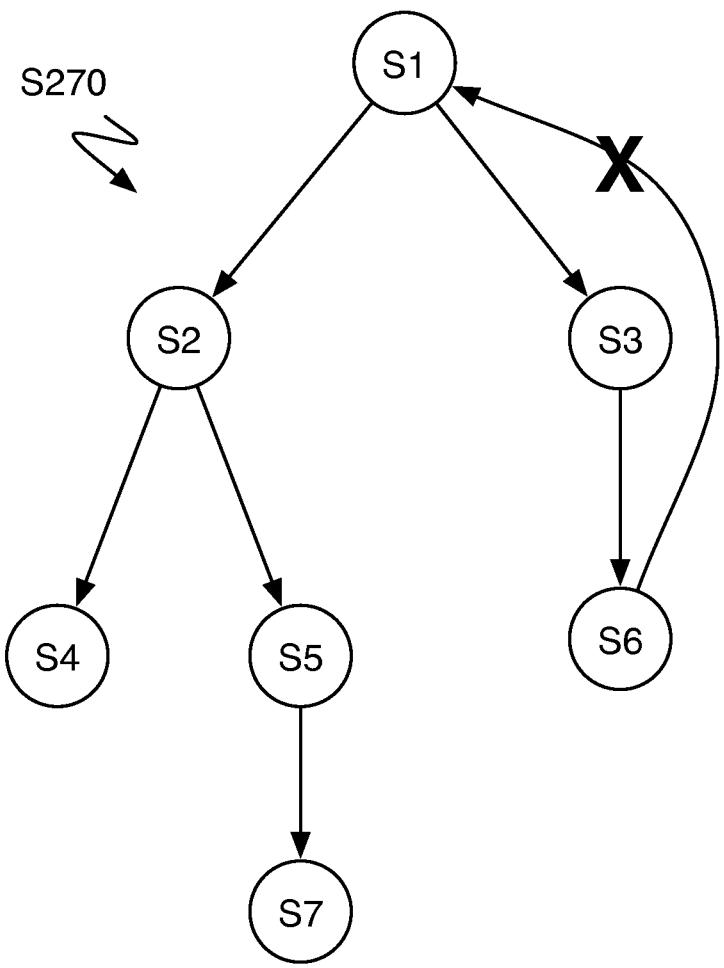
FIG. 12 is a schematic representation of a dependency graph.

The method 200 additionally preferably includes identifying service instances S270, which functions to determine which service instances to alter in Step S250. Service instances may be identified by processing a configuration file. The file is preferably describes the architecture of the plurality of machines. In one example a markup language may be used to describe the configuration as shown in FIG. 11. Subgroup parameters may be used to identify the appropriate service instances. Additionally, the Step S270 may include identifying service instances that are dependent on a particular service instance. In this way, when a service instance has machine state altered, all service instances that depend on that service instance are notified of the change. Preferably, a dependency graph is created to show the dependency relationships of the services of a computing cluster as shown in FIG. 12. The dependency graph is preferably acyclical. When building a dependency graph, the configuration of the services may additionally be validated. For example, cycles may be identified and eliminated. When altering machine state in Step S150, the service instances are preferably altered in an order based on the dependency graph. This may be from leaf nodes to dependent services or from dependent services to leaf nodes of the dependency graph. The order may additionally be based on what machine state changes are occurring. In the dependency graph, dependency order follows the connections starting at the leaf nodes. In the variation where there is a load balancer for a service, then that load balancer is preferably updated when the service being load balanced is altered.

In another variation, the method includes monitoring the operation status of machines and/or services of the computing cluster. A scaling parameter is preferably set so that services may be scaled automatically when the scaling parameter is satisfied. The scaling parameter may be threshold, a pattern of events, or any suitable parameter to trigger the altering of service and/or host machine state. Thresholds are preferably set for appropriate operation parameters, and when a machine or a service instance reaches the threshold, scaling of a service may be automatically initiated by altering the machine state of appropriate services. A threshold is preferably set for provisioning and for deprovisioning such that the computing cluster can scale up and down. The configuration controller preferably manages this monitoring, but monitoring may alternatively occur on the machine or by any suitable component. In a telecommunication platform, the computing cluster preferably has very unique scaling requirements as compared to other systems. Large spikes may occur at any time. Telecommunication platforms additionally have a plurality of types of input channels. For example, a telecommunication platform preferably supports voice sessions, messaging, (e.g., SMS and/or MMS), video, and any other suitable type of input channel. The types of input channels typically have different service requirements. Service may be monitored and automatically altered according to the type of input channel. Services that are shared between services may additionally be pooled between types of input channels. The type of input channels of a telecommunication platform may include voice, video, messaging (e.g., SMS or MMS), or any suitable type of input channel.

Additionally, the method may be used to orchestrate a computing cluster being used with sustained session. A sustained session is preferably any suitable session that requires sustained use of a service instance for the duration of the session. Some examples of sustained sessions include voice calls and video streams that occur on telecommunications platforms. A service instance handling an operation for a sustained session is preferably kept at a constant state until all sustained sessions can cease use of that service instance. Preferably, the service instances that are dependent on such a service instance are altered appropriately in preparation, and when the sustained session ends, then the service instance is altered.

3. Method of a Third Embodiment for Managing a Computer Cluster

Figure 16:
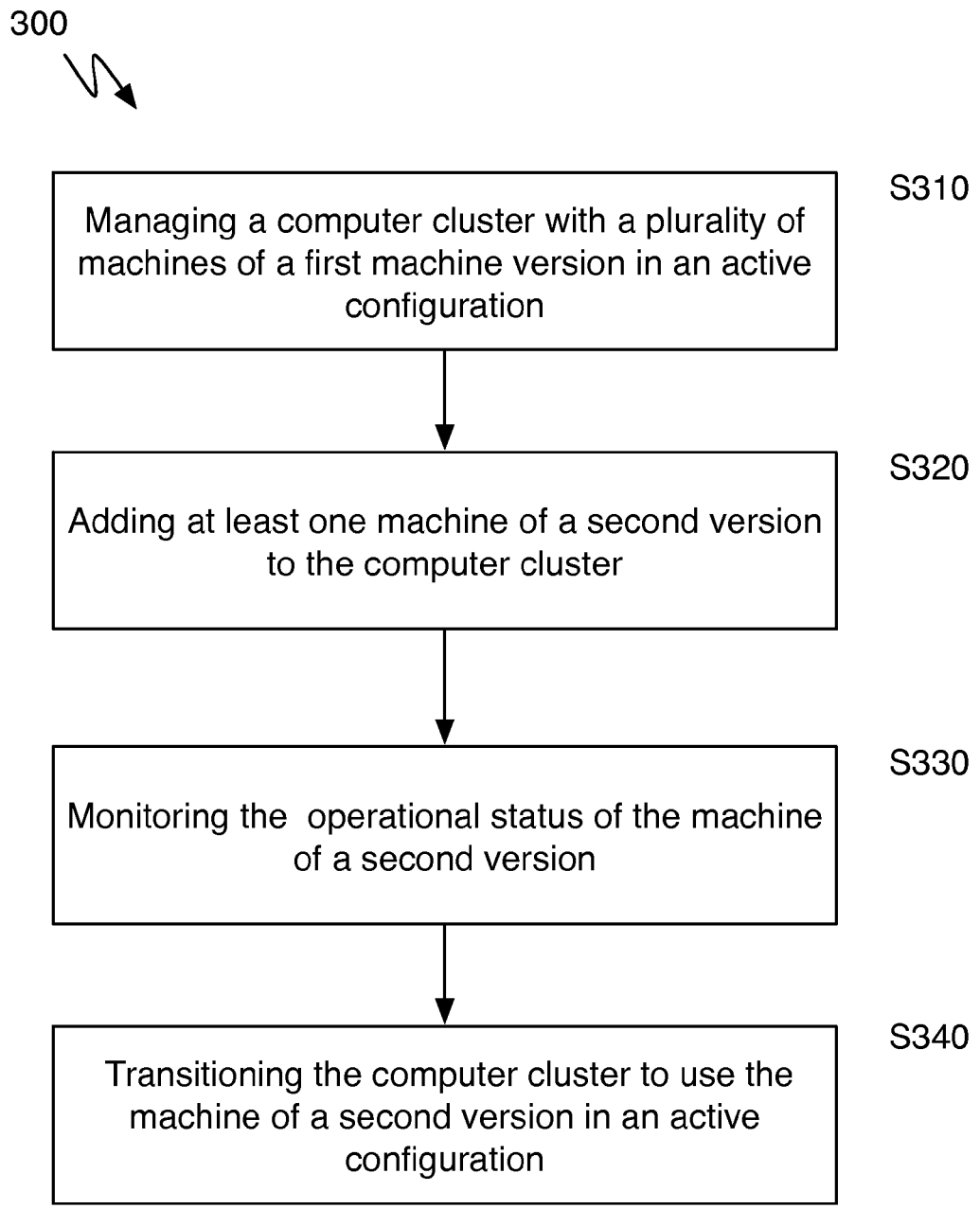
FIG. 16 is a flowchart representation of a method of a third preferred embodiment.

As shown in FIG. 16, the method 300 of a preferred embodiment for managing a computer cluster may include managing a computer cluster with a plurality of machines of a first machine version in an active configuration S310, adding at least one machine of a second version to the computer cluster S320; monitoring the operational status of the machine of a second version S330; and transitioning the computer cluster to use the machine of a second version in an active configuration S340. The method functions to use methods of computer cluster management of a preferred embodiment to control the release of new machine versions. The method may additionally add the machine of a second version in a staging configuration according to various transition strategies. Using the transition strategies, machines may be rolled into the operation of the computer cluster without risking adverse effects due to unforeseen errors or issues when the different version of the machine is used in a larger system. The method utilizes the versioned nature of machine state as discussed above and the concept of operational status monitoring to introduce new machines in a controlled manner. The method is preferably applied when introducing updates to machines but can additionally be used to revert to previous versions (i.e., machine state).

Figure 17:
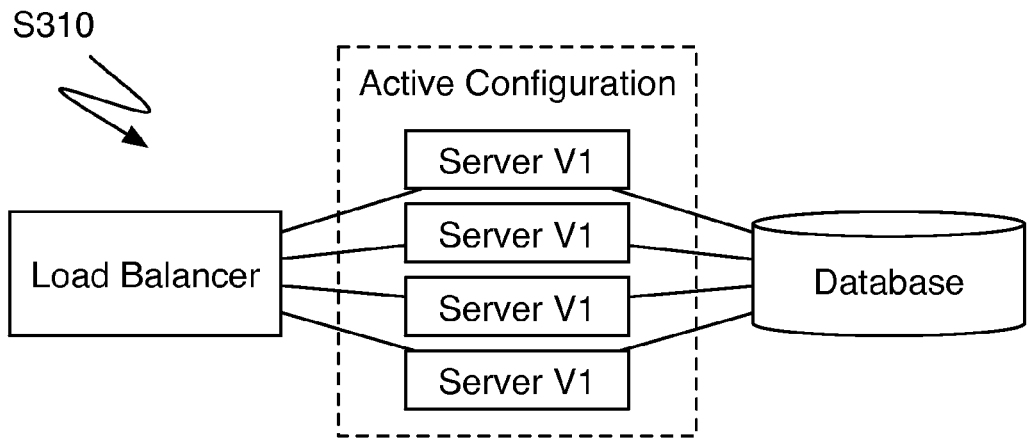
FIG. 17 is a detailed schematic representation of managing a computer cluster of machines of a first machine version.

Step S310, which includes managing a computer cluster with a plurality of machines of a first machine version in an active configuration, functions to run a computer cluster. The computer cluster is preferably managed in a manner substantially similar to the manner described above. The machines are typically network accessible services. The machines may be stand alone physical machines but may alternatively be a virtual machine, service, process, or any suitable operational component of a computing cluster. A machine is preferably versioned to a particular machine state. The machine version is preferably tracked along with the implications of that version (e.g., software versions, data resources, etc.). Alternatively, machine version may refer to the unique machine configuration. The machine version preferably includes configuration data and software. The machine version may additionally include operational data. In managing a computer cluster, a configuration controller may facilitate management of the plurality of machines. Managing a computer cluster with a plurality of machines preferably includes load balancing the plurality of machines of a first machine version. As shown in FIG. 17, a load balancer preferably distributes incoming data to a plurality of devices.

The machines of a first version (hereafter referred to as MV1) are preferably configured for active operation within the computer cluster. In one preferred variation, machines may be configured as active, staged, or inactive. Active configuration preferably describes machines that are operating and being used in production. Typically, being used in production will include impacting state of the machine or a second machine, generating responses, performing a task on behalf of another component, or performing any process required in the operation of the computing cluster. In one variation, an actively configured machine will process data and store a result in a production database. In another variation, an actively configured machine will generate and transmit a response to an entity that made a request to the machine (e.g., a user or application). Thus, operation of an actively configured machine can impact the operational performance of the computing cluster.

A staged configuration preferably describes machines that are operating but integrated into the computer cluster in a controlled and/or limited manner. One technique to integrating the machine into the computer cluster in a limited manner would be to prevent the machine from modifying outside machine state. For example, the machine in a staged configuration may perform a task to update a database, but communication to the database may be ignored or a test database may be used for monitoring the database operations. An alternative technique to integrating the machine into the computer cluster in a limited manner would be to monitor the actions and/or response of the machine. The staged configuration is preferably used for monitoring a machine prior to integrating the machine into an active configuration. A machine in staged configuration will operate on data actively processed by the computer cluster, but while minimizing the risk of the machine impacting the operation of the computer cluster.

An inactive configuration preferably describes machines that are operational but not integrated for use within the computer cluster. A machine in an inactive configuration is preferably booted and ready for integration into the computer cluster. The machine may additionally be put into a sleep mode where the machine can be more quickly activated. An inactive configuration is preferably used for machines that are on standby. A machine in an inactive configuration may be backup machine for machines in an active configuration. For example, if a machine of a second machine version replaces a machine of a first machine version, then the machine of a first version may be kept in an inactive configuration in case the computer cluster needs to quickly revert to the old computer cluster state/configuration. Machines may additionally be set to a deactivated configuration, where the machine is powered down or deprovisioned from the cluster.

Figure 18:
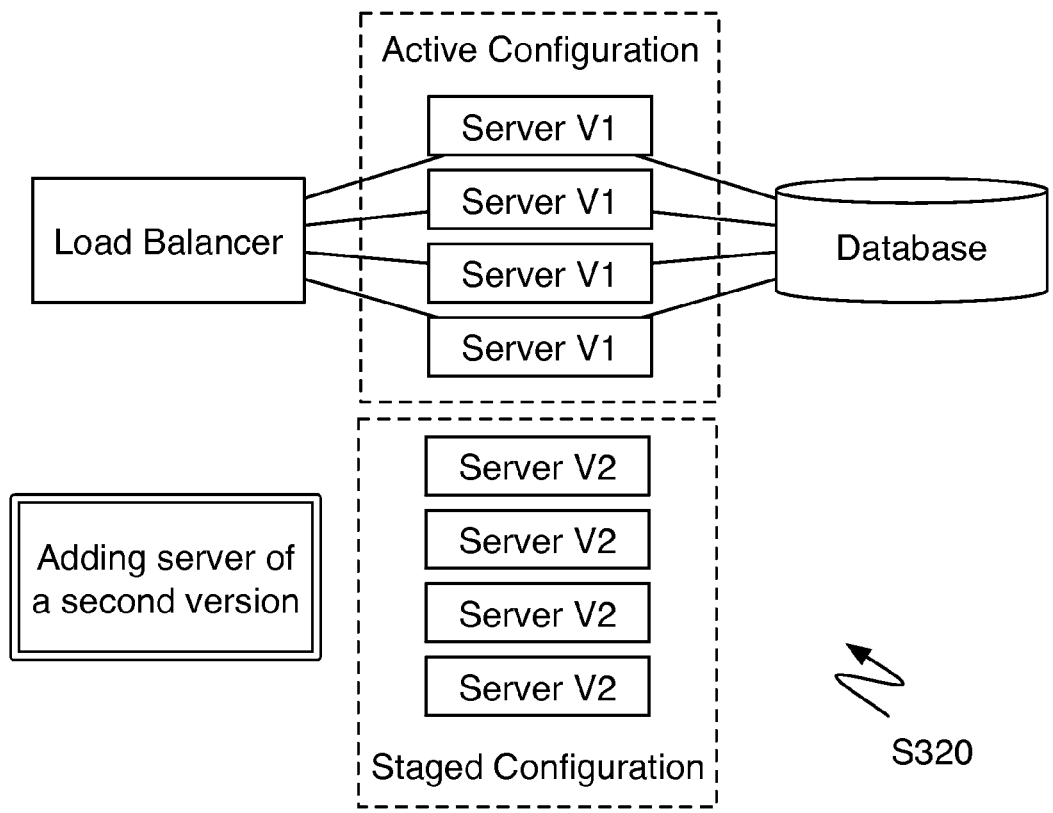
FIG. 18 is a detailed schematic representation of adding a machine of a second version to a computer cluster.

Step S320, which includes adding at least one machine of a second version to the computer cluster, functions to add a machine versioned different than the MV1. Typically, the machine of a second version (hereafter referred to as MV2) is an eventual or potential replacement to the MV1. Responsibilities and utility of the MV1 is typically redundant to the responsibilities and utility of MV2. As such, MV2 is preferably an updated machine version of MV2. Alternatively MV2 may be a previous version or completely new version. Adding the at least one MV2 may include incorporating the MV2 into a joint operational configuration of a plurality MV1's. Joint operational configuration describes computer cluster configuration to appropriately distribute work to a plurality of machines. As shown in FIG. 18, MV2 may be added in parallel to a plurality of MV1's that share at least one loadbalancer. As the second machine version will typically be meant to replace all instances of the first machine version, a plurality of MV2's will be added. At least one MV2 is preferably added in a staged configuration. In the variation where a plurality of machines is added, a subset may be added in a staged configuration and a subset may be added in an inactive configuration. The machines may alternatively be added in any suitable combination of configurations. Introducing an MV2 may require updates to other types of machines/services, and thus, a plurality of related machines of a third version may additionally be added. The machines of a third version may be based on state calculations as described above. The machines of a third machine version will typically be machines that will need to be updated according to the change in machine version. For example, if a new server version is introduced, a new database configuration may need to be deployed to work in combination with the new server. Such related machines may also be added in a staged and/or inactive configuration.

Step S330, which includes monitoring the operational status of the machine of a second version, functions to detect issues in computer cluster operation due to the introduction of an MV2. The operational status of MV2 preferably includes errors of the MV2, errors of other machines that attributed directly or indirectly to the MV2, inconsistencies of MV2 behavior, actions by the MV2, performance metrics, and/or any suitable indicators of the performance of MV2. Errors or quality metrics can be gathered through logs and other suitable analytic tools. Actions such as response communications and requests (e.g., database commands) can be simulated and/or compared to expected results (e.g., responses and requests of an MV1). Performance metrics are preferably a measure of how a task was performed by MV2. For example, if MV2 introduces a new algorithm for processing data, the computation time may be monitored. The operational status of the MV2 is preferably compared to the operational status of MV1. The health of the operational status may be measured relative to the MV1. In other words MV2 may be monitored to measure if MV2 has improved, equal, or decreased performance. For example, the errors encountered when MV2 is used may be compared to the errors encountered when MV1 is used.

Monitoring the operational status may additionally include executing a monitored transition strategy on a MV2, which functions to augment the operation of the computer cluster to facilitate monitoring an MV2. A transition strategy preferably impacts the manner in which a MV2 is integrated into the computer cluster. The strategy preferably determines the configuration of a plurality of MV2s and the transition conditions and/or progress from MV1s to MV2s. Preferably, at least one MV2 is initially added in one of a variety of staged configurations.

Figure 19A:
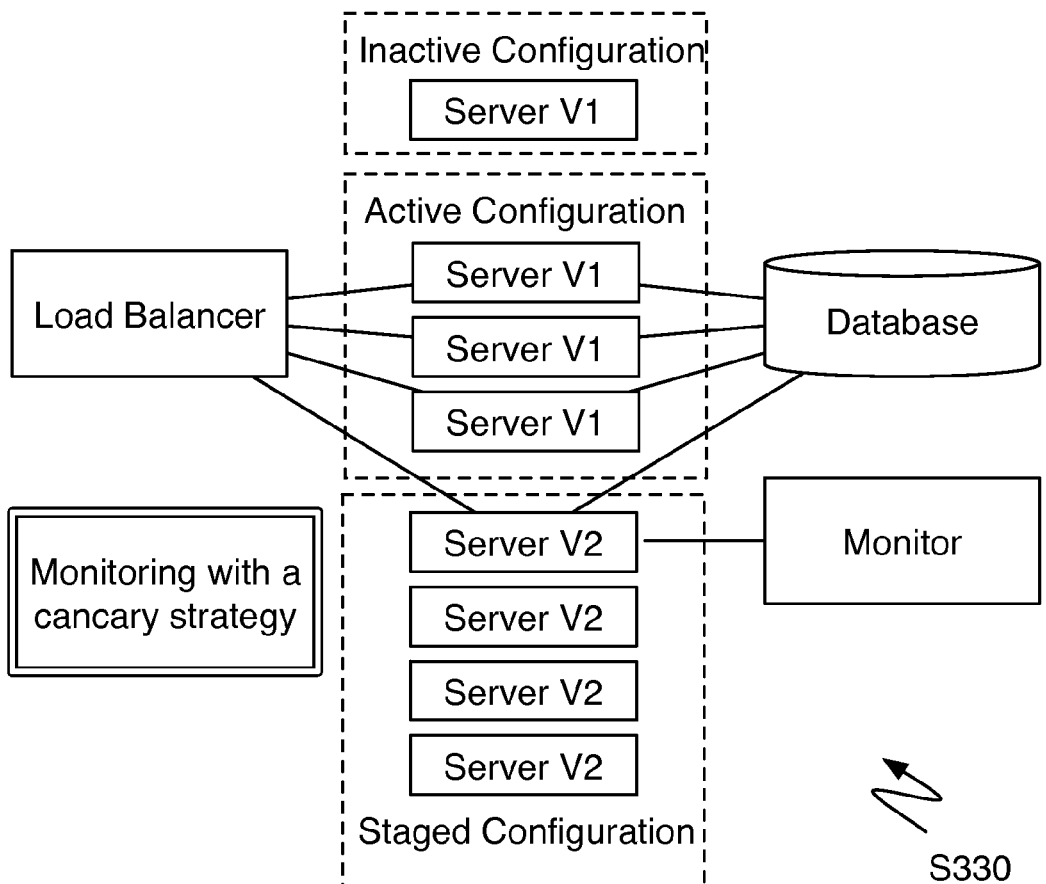
FIGS. 19A and 19B are detailed schematic representations of exemplary transition strategies.

In a first variation of a staged configuration, the staged configuration is a limited active configuration (i.e., a "canary configuration"), which functions to use the MV2 in a limited capacity to warn of potential problems. Ideally, if there are issues with the MV2 the issues will only impact a small portion of tasks in the computer cluster. For example, if there are 19 MV1's and only 1 MV2 are used to service processing request then roughly 5% of processing requests will have a chance of encountering the issues introduced by the MV2. While in the limited active configuration, the operational status of the MV2 is preferably monitored. Based on the monitored operational status, more or fewer MV2's may be added to the computer cluster. MV2s are preferably incrementally or gradually introduced such that the replacement of the plurality of MV1s is distributed over a sustained period of time. MV1s are preferably incrementally replaced until all or a suitable portion of MV1s have been replaced by MV2s. During that time, monitoring of operational status preferably continues and the operational status may be used to inform the transition. Preferably, a plurality of MV1's is loadbalanced. A new MV2 is preferably introduced for load balancing along with the plurality of MV1's as shown in FIG. 19A. Requests of the loadbalancer are preferably equally delivered to either one of the MV1's or the MV2. The load balancer may additionally provide customized load balancing treatment to the MV2. For example, a MV2 may receive particular types of work delivered by the load balancer, or may be delivered less work than MV1's.

Figure 19B:
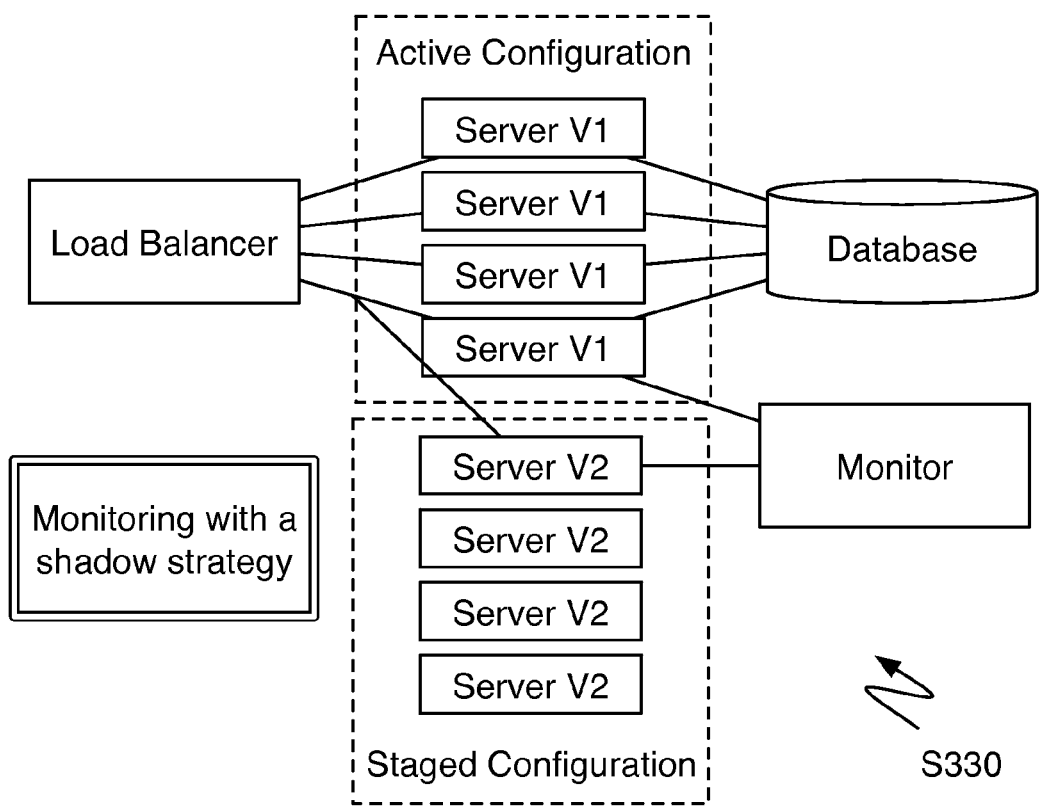

In another variation of a staged configuration, the staged configuration is a simulation configuration (i.e., a "shadow configuration"). Machines in a simulation configuration are preferably semi-isolated and are, in a sense, quarantined from impacting operation of other components. When in simulation configuration a machine preferably operates on live data but the machine is prevented from impacting operation of outside machines. In particular, a simulation configuration limits the MV2 from impacting state and/or operation of a machine in an active configuration (e.g., a server or database used replying to an outside request). The live data is additionally sent to an active machine for normal processing. If a related machine was added based on a state calculation, the MV2 and related machine(s) may cooperatively operate in the simulation configuration, but the machines within the simulation configuration are preferably blocked from altering the state of machines not within the simulation configuration. A plurality of different simulations through out the system may occur simultaneously. Preferably, the MV2 is matched with at least one MV1. Incoming communication, data, and/or requests are preferably sent to both the MV1 and the MV2 as shown in FIG. 19B. In other words, the communication to the MV2 (e.g., inbound communication, work requests etc,) is coupled to the communication to an MV1. The incoming information may be communicated simultaneously or asynchronously. The MV1 and the MV2 both will handle the incoming information according to the respective machine version. The MV1 will preferably be enabled to make outgoing actions in response to the incoming information. The MV2 will preferably be prevented from making outgoing actions that would impact active components of the computer cluster. In one variation a test component may be set up for the MV2. The test component may be analyzed to indirectly monitor the operational status of the MV2. For example, a plurality of MV1's may be load balanced along with at least one MV2. The task of the MV1 and the MV2 in this example may be to process some work and write the result to a database. Work from the load balancer is preferably delivered to one of the MV1 and to the MV2. The MV1 and the MV2 will process the work and attempt to write to a database. MV1 will preferably write to a production database that is used in subsequent operations. MV2 may attempt to write to a test database. The attempts to write are preferably monitored. They can additionally be compared to those of the MV1 to ensure consistency or expected results. The MV2 may alternatively write to a test database and the state of the test database may be compared to the production database. The simulation configuration allows work to be handled in an established manner by MV1 while also allowing a MV2 to process work seen by the computer cluster (e.g., real world processing requests) without allowing the results to impact operation of the computer cluster.

Figure 20:
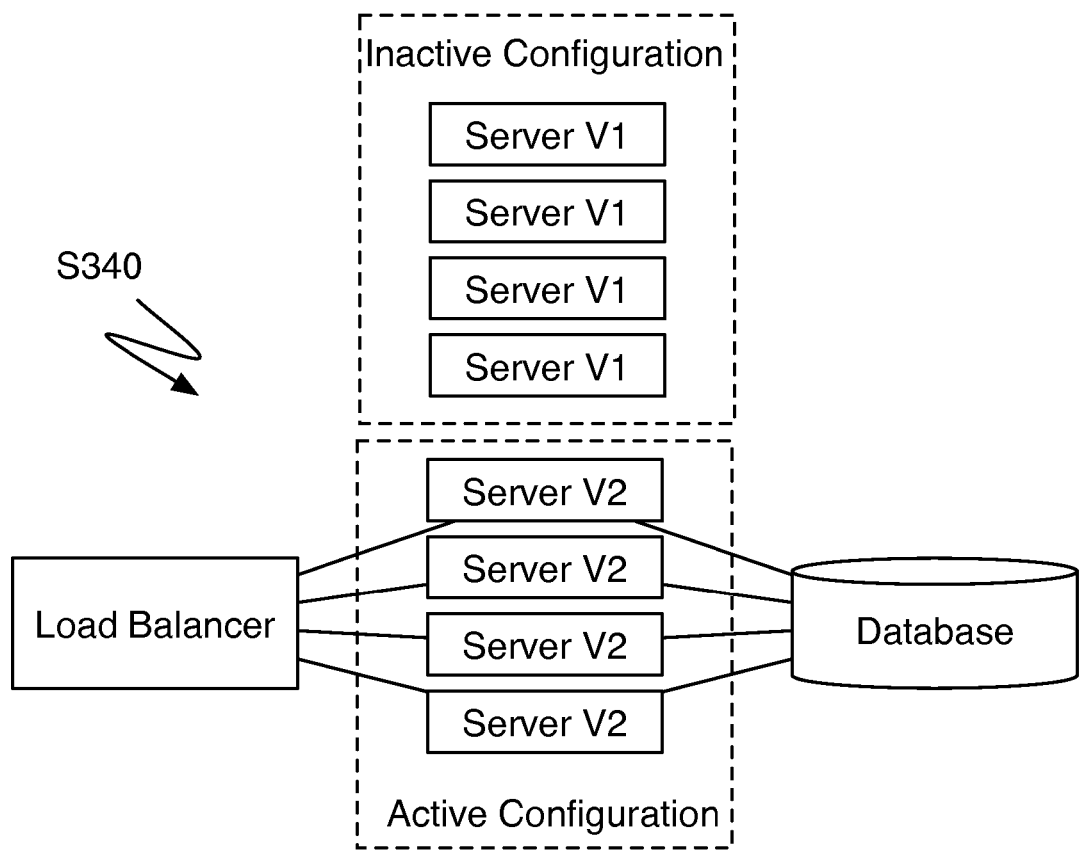
FIG. 20 is a detailed schematic representation of transitioning the computer cluster to use machines of a second version.

Step S340, which includes transitioning the computer cluster to use the machine of a second version in an active configuration, functions to introduce the MV2 to replace a MV1. The computer cluster can preferably be eventually updated to use only the second machine version (in place of the first machine version) as shown in FIG. 20. The transitioning to a MV2 in an active configuration may be triggered upon the monitored operational status satisfying a condition. Operational status conditions may include length of time in staging configuration, number of errors, rate of errors, performance metrics, and/or any suitable operational status parameter. For example, an MV2 may be tested for a week and the computer cluster may transition from an MV1 to the MV2 if the number of monitored errors during that week was below a specified threshold. Preferably, the transitioning the computer cluster to use the machine of a second version in an active configuration includes transitioning at least one MV2 from a staging configuration to an active configuration. Preferably an MV1 will be removed from active configuration. Removing from active configuration may include transitioning from an active configuration to an inactive configuration, removing the machine from the load-balancer, transitioning from an active configuration to a staged configuration, deprovisioning a machine (powering down the machine), updated machine from a first machine version to the second machine version, or any suitable action to transition away from the first machine version. The transition is preferably based on the monitored operational status of at least one MV2. If the MV2 operational status does not satisfy operational requirements (e.g., there numerous errors occurring), then the computer cluster will preferably not transition to the second machine version. A subsequent machine version may be developed, staged and monitored, and then possibly transitioned to if MV2 does not meet the operational requirements. On the other hand, if the MV2 operational status satisfies operational requirements, then the computer cluster may transition to the MV2. Several sequences of transitioning may be used. All MV1's may be simultaneously removed from active configuration and replaced by MV2's. Alternatively, a gradual, incremental rollout of MV1 replacement may be performed, where for a period of time MV1's and MV2's may both be in active configuration. The incremental transition preferably progresses conditionally based on the operational status of MV2's in a staging configuration. If the operational status satisfies a condition (e.g., error count is below a threshold), then the transition proceeds. If the operational status fails a condition (e.g., error count above a threshold or operations inconsistent with expected behavior), then the computer cluster can halt the transition and even revert configuration of machines. Additionally, there may be various staged configurations that a MV2 must progress through. For example, a MV2 may first be added in a simulation configuration. If the MV2 operation status satisfies appropriate thresholds, then the MV2 may be set to a limited active configuration. If the MV2 then satisfies operation status thresholds for this state, then the MV2 may be set to an active configuration. Any alternative transition strategies may be used.

A method of a preferred embodiment may additionally or alternatively include reverting the computer cluster from a machine of a second machine version to a machine of a first machine version. Preferably, the MV1 that was replaced as the active component by an MV2 was set to an inactive configuration. The MV1 is thus transitioned out of the inactive configuration into an active configuration. For example, a computer cluster may initially be load balancing a plurality of machines in a second machine version that are handling processing work for the computer cluster (i.e., the MV2's are in an active configuration). A plurality of machines in a first machine version that were recently decommissioned may be kept powered in a standby mode but not handling any work from a load balancer (i.e., the MV1's are in an inactive configuration). If suddenly numerous errors begin to occur that were previously not encountered when the MV1's were in active configuration, the system many automatically revert to the MV1's. Because the MV1's were kept in an inactive configuration they can be quickly reconfigured to replace the MV2's. The MV2's may be set to an inactive configuration or alternatively set to a staging configuration for additional monitoring. If the source of the problem is identified or resolved the MV2's may once again be actively configured.

4. System for Managing a Computer Cluster

Figure 13:
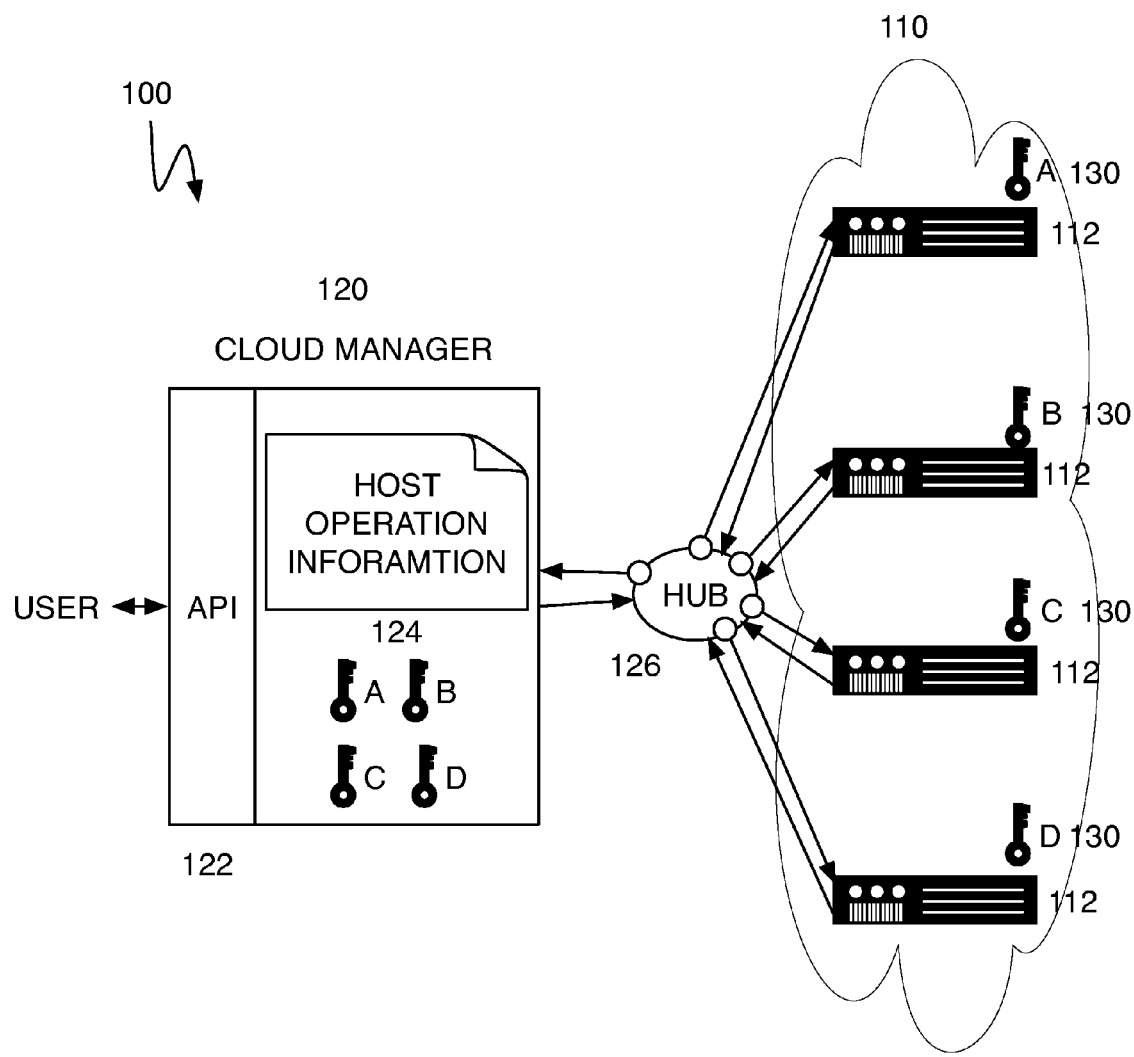
FIGS. 13 and 14 are schematic representations of a system of a preferred embodiment of the invention.
Figure 14:
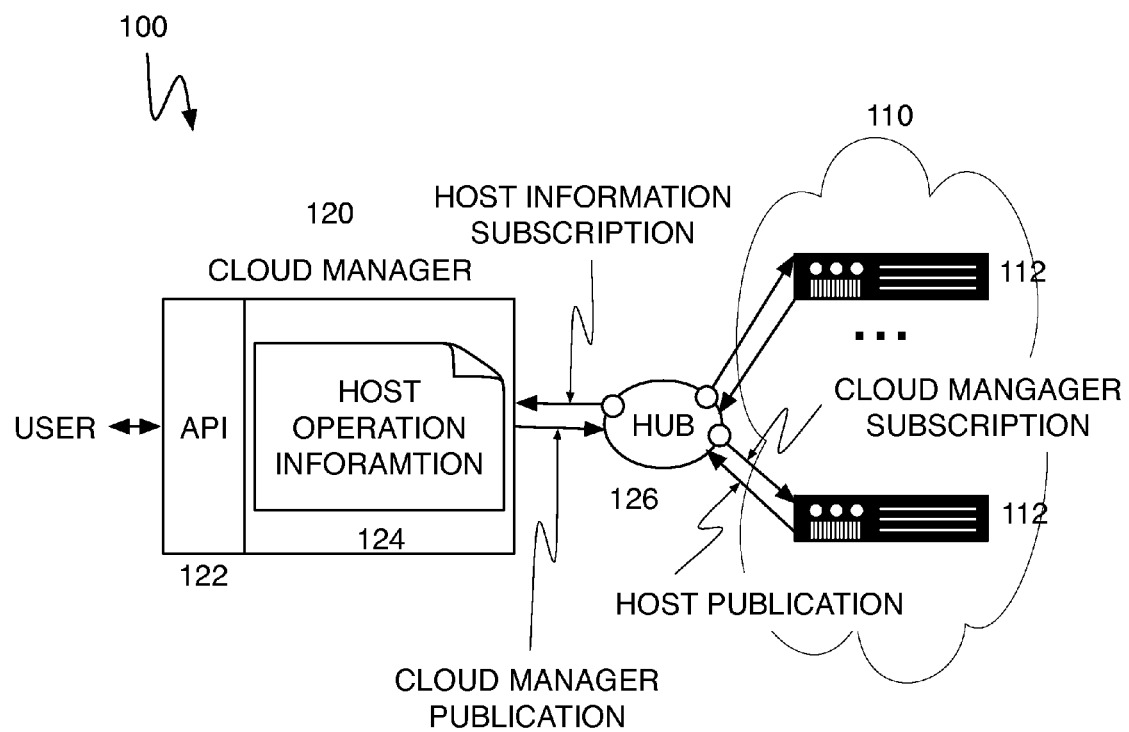

As shown in FIGS. 13 and 14, the system 100 of the preferred embodiment for managing a computer cluster preferably includes a computing cluster 110 and a configuration controller 120. The system functions to provide an interface for easy monitoring and configuration of the computing cluster 110. The configuration controller 120 preferably additionally includes an access application programming interface (API) 122, machine state database 124, and a machine communication system 126. The system 100 may be used with any suitable cloud-computing environment. One preferred embodiment uses the system 100 with a telephony network platform such as the one described in patent application Ser. No. 12/417,630 filed 2 Apr. 2009, titled System and "Method for Processing Telephony Sessions", which is incorporated in its entirety by this reference.

The computing cluster no of the preferred embodiment functions to provide the base infrastructure a user is wishing to manage. The computing cluster 110 is preferably composed of a plurality of machines 112 or computing resources/machines. The machines may be identical in setup or may alternatively be composed of a variety of systems such as web servers, voice over internet protocol (VoIP) systems, media processors, load balancers, databases, proxy servers, caches, queues, and/or any suitable computing device and/or storage devices. The computing cluster no may be composed of a variety of hardware systems, software platforms, and/or virtual machines. A machine 112 preferably has operation information available to interested parties, preferably access through the configuration controller 120. The operation information preferably includes machine status (e.g., booting, running, shut down, etc.), internal internet protocol (IP) address, external IP, role (e.g., web server, VoIP, load balancer, media processor, etc.), capacity/load, and/or any suitable operation settings or information. A machine 112 preferably manages communication of the operation information and self operation (such as performing roles or changing status). A machine additionally has machine state information. The machine state information preferably includes configuration data, software, and operational data. The configuration data is preferably similar to file system related data. The software is preferably the code or source code executed by the machine. The operational data is resources such as a database, media resources, persistent data, or any suitable data used in operation. The machine state may alternatively include any suitable combination of the configuration data, software, operational data, operational information and/or other machine related data. A machine may alternatively have a parent device that manages, monitors, and communicates operation information of the machine, such as a load balancer in charge of a plurality of resources.

The configuration controller 120 of the preferred embodiment functions to act as an interface to controlling the computing cluster 110. The configuration controller functions to simplify the management and control of a cloud-computing environment. The configuration controller preferably includes an access API 122, a machine state database 124, and a machine communication system 126. The configuration controller additionally includes a state machine engine that generates new machine state of a machine. The inputs to the state machine engine preferably include the old machine state. A plurality of machine states of associated machines may additionally be input into the state machine engine.

The access API 122 preferably functions to act as an interface for interested parties to interact with operation information and change the operation of machines within the computing cluster 110. The access API is preferably a REST API (Representational State Transfer API) as is known in the art, but the access API may alternatively be a SOAP (Simple Object Access Protocol) API or any suitable programmatic communication interface. A REST API preferably follows RESTful practices as is well known in the art. RESTful is understood in this document to describe a Representational State Transfer architecture. RESTful Hypertext Transfer Protocol (HTTP) requests are preferably made to the configuration controller 120. The HTTP requests are preferably stateless, thus each message communicated preferably contains all necessary information for operation of a user command. The configuration controller preferably does not need to remember or store previous communications to be aware of the state. The machines 112, machine state, and related resources are preferably viewed as addressable resources. Consistent with the RESTful conventions, a GET request of a resource may return the current state of a resource, while PUT may update the state, PUT or POST may be used to create a new resource, and DELETE may be used to destroy a resource. The access API 112 can preferably be used by users to access operation information of one or more of the machines in the computing cluster 110. For example, as a REST API a simple HTTP request using the access API 122 can obtain a list of machines, and can preferably filter information on status, role, or any suitable operation information. The operation information is preferably returned in an HTTP response, preferably containing the operation information formatted as xml.

The machine state database 124 preferably functions to store operation information of the machines 112 of the computing cluster 110. The machine state database 124 may be any suitable database or device for storing data such as a mySQL database or an XML file. The machine state database 124 preferably stores a record for each machine 112. The information stored for each machine 112 preferably includes machine state, internal and/or external IP addresses of the machines, status, role(s), capacity/load, and/or any suitable operation information. The database 124 may additionally store a security key 130 for each machine to securely identify a machine 112.

The machine communication system 126 preferably functions to be a communication infrastructure between machines 112 of the computing cluster 110 and the configuration controller 120. The machine communication system 126 is preferably a publishing and subscription service such as pubsub messaging system. As shown in FIG. 8, the pubsub variation of the machine communication system 126 preferably has a number of configured subscriptions and publication channels. The configuration controller 120 preferably subscribes to the notifications published by the machines 112. These notifications preferably include the operation information submitted by the machines. The machines 112 preferably individually subscribe to messages from the configuration controller 120 or any suitable party such as other machines 112. New machine state is preferably communicated from the configuration controller to the machines. There is preferably a hub that the machines and the configuration controller 120 communicate through using the pubsub system. The configuration controller 120 may function as a hub or an outside system may be used as a hub. Additionally, there may be any suitable number of hubs, such as for a system geographically distributed.

Additionally, the system of the preferred embodiment preferably includes a secret key 130 shared by a machine 112 and the configuration controller 120. The secret key 130 is preferably a cryptographic code that uniquely verifies communication between the machine 112 and configuration controller 120. The secret key 130 is preferably supplied at boot time of the machine 112 but may alternatively be established at any suitable time. The secret key 130 is preferably included in communications between a machine 112 and the configuration controller 120.

An alternative embodiment preferably implements the above methods in a computer-readable medium storing computer-readable instructions. The instructions are preferably executed by computer-executable components preferably integrated with a distributed, networked computing cluster with a plurality of machines and a configuration controller. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:
1. A hardware implemented method for managing a telephony platform computing cluster system, the method comprising:
at the telephony platform computing cluster system,
the cluster system including a telephony platform networked computing cluster and a configuration controller,
the computing cluster including a plurality of telephony call router services, a plurality of telephony load balancer services, a plurality of first version machines of a first version that are in an active configuration, and at least one second version machine of a second version that is in a simulation configuration,
each call router service being communicatively coupled with a dedicated telephony service load balancer service,
at least one load balancer service distributing telephony jobs of the associated telephony call router service to at least one first version machine in the active configuration and at least one second version machine in the simulation configuration,
the at least one first version machine actively performing telephony service operations of at least one dependent telephony service that is managed by the load balancer service,
the at least one second version machine simulating telephony service operations of the at least one dependent telephony service,
the at least one dependent telephony service including two or more of a media processor service, a routing service, a call queue service, a resource database service, and a proxy service:
a first load balancer service distributing a first telephony job of an associated first telephony call router service to a first version machine in the active configuration and a second version machine in the simulation configuration;
the first version machine actively performing at least one telephony service operation for the first telephony job;
the second version machine simulating the at least one telephony service operation for the first telephony job;
the configuration controller monitoring active operational status of the actively performed at least one telephony service operation and simulated operational status of the simulated at least one telephony service operation;
the configuration controller determining whether the simulated operational status satisfies a joining condition based on a comparison of the monitored simulated operational status with the monitored active operational status; and responsive to a determination that the simulated operational status satisfies the joining condition, the configuration controller transitioning configuration of the second version machine from the simulation configuration to the active configuration, such that the second version machine actively performs the at least one telephony service operation for the computing cluster while the first version machine continues to actively perform the at least one telephony service operation for the computing cluster.

2. The method of claim 1, wherein the first version machine is a service with a first version number that is running on a host, and the second version machine is a service with version number different from the first version number that is running on a host.

3. The method of claim 2, wherein the second version is a version number greater than the version number of the first version.

4. The method of claim 2, wherein the second version is a version number less than the version number of the first version.

5. The method of claim 1, further comprising the simulation configuration limiting the second version machine from impacting a computer cluster component in an active configuration.

6. The method of claim 5, wherein the simulation configuration comprises coupling communication to the second version machine with communication to the first version machine.

7. The method of claim 1, wherein the simulation configuration limits output from the second version machine from impacting a machine in an active configuration, wherein limiting output from the second version machine from impacting a machine in an active configuration comprises the second version machine writing to a test database.

8. The method of claim 7, wherein monitoring the simulated operational status comprises analyzing the test database.

9. The method of claim 1,
wherein the telephony platform computing cluster system is a hardware telephony platform computing cluster system,
wherein the telephony platform networked computing cluster is a hardware telephony platform networked computing cluster, the hardware telephony platform networked computing cluster including at least one non-transitory computer-readable storage medium that stores computer-readable instructions that when executed control the computing cluster to perform the monitoring, the determining, and the transitioning,
wherein the configuration controller is a hardware configuration controller, the hardware configuration controller including at least one non-transitory computer-readable storage medium that stores computer-readable instructions that when executed control the configuration controller to perform: the distributing of the first telephony job; the active performance of the at least one telephony service operation, and the simulation of the at least one telephony service operation, and
and wherein the hardware configuration controller is communicatively coupled with the hardware computing cluster.

10. The method of claim 9, wherein each call router service includes a call router Application Programming Interface (API) that is used for modifying call router resources to alter state of the call router service and for interacting with media of the call router service, wherein the call router API is a REST API.

11. The method of claim 1, wherein monitoring the simulated operational status comprises monitoring performance of the second version machine during simulation of the at least one telephony service operation.

12. The method of claim 1, wherein monitoring simulated operational status comprises monitoring errors of the second version machine in comparison to the first version machine.

13. The method of claim 1, further comprising the first version machine writing data to a production database and the second version machine writing data to a test database, wherein comparison of the monitored simulated operational status with the monitored active operational status comprises comparing the production database and the test database.

14. The method of claim 1,
wherein simulated operational status includes actions by the second version machine,
wherein actions by the second version machine include at least one of simulated response communications and simulated requests,
wherein active operational status includes actions by the first version machine,
wherein actions by the first version machine include at least one of active response communications and active requests, and
wherein determining whether the simulated operational status satisfies a joining condition comprises at least one of:
comparing a simulated response communication of the second version machine with a corresponding active response communication of the first version machine, and
comparing a simulated request of the second version machine with a corresponding active request of the first version machine.

15. A hardware telephony platform computing cluster system, the telephony platform computing cluster system comprising:
a configuration controller; and
a telephony platform networked computing cluster that includes a plurality of telephony call router services, a plurality of telephony load balancer services, a plurality of first version machines of a first version that are in an active configuration, and at least one second version machine of a second version that is in a simulation configuration,
each call router service being communicatively coupled with a dedicated telephony service load balancer service,
at least one load balancer service distributing telephony jobs of the associated telephony call router service to at least one first version machine in the active configuration and at least one second version machine in the simulation configuration,
the at least one first version machine actively performing telephony service operations of at least one dependent telephony service that is managed by the load balancer service,
the at least one second version machine simulating telephony service operations of the at least one dependent telephony service, the at least one dependent telephony service including two or more of a media processor service, a routing service, a call queue service, a resource database service, and a proxy service, wherein the telephony platform computing cluster system includes at least one non-transitory computer-readable storage medium that stores computer-readable instructions that when executed perform processes including:

controlling a first load balancer service to distribute a first telephony job of an associated first telephony call router service to a first version machine in the active configuration and a second version machine in the simulation configuration, controlling the first version machine to actively perform at least one telephony service operation for the first telephony job, controlling the second version machine to simulate the at least one telephony service operation for the first telephony job, controlling the configuration controller to monitor active operational status of the actively performed at least one telephony service operation and simulated operational status of the simulated at least one telephony service operation, controlling the configuration controller to determine whether the simulated operational status satisfies a joining condition based on a comparison of the monitored simulated operational status with the monitored active operational status, and responsive to a determination that the simulated operational status satisfies the joining condition, controlling the configuration controller to transition configuration of the second version machine from the simulation configuration to the active configuration, such that the second version machine actively performs the at least one telephony service operation for the computing cluster while the first version machine continues to actively perform the at least one telephony service operation for the computing cluster.

16. A non-transitory computer-readable storage medium that stores computer-readable instructions, the non-transitory computer-readable storage medium comprising:

instructions for managing a hardware telephony platform computing cluster system, the telephony platform computing cluster system including:
a configuration controller; and
a telephony platform networked computing cluster that includes a plurality of telephony call router services, a plurality of telephony load balancer services, a plurality of first version machines of a first version that are in an active configuration, and at least one second version machine of a second version that is in a simulation configuration, each call router service being communicatively coupled with a dedicated telephony service load balancer service, at least one load balancer service distributing telephony jobs of the associated telephony call router service to at least one first version machine in the active configuration and at least one second version machine in the simulation configuration, the at least one first version machine actively performing telephony service operations of at least one dependent telephony service that is managed by the load balancer service, the at least one second version machine simulating telephony service operations of the at least one dependent telephony service, the at least one dependent telephony service including two or more of a media processor service, a routing service, a call queue service, a resource database service, and a proxy service, wherein the instructions for managing the hardware telephony platform computing cluster system include instructions that when executed perform processes including:

controlling a first load balancer service to distribute a first telephony job of an associated first telephony call router service to a first version machine in the active configuration and a second version machine in the simulation configuration, controlling the first version machine to actively perform at least one telephony service operation for the first telephony job, controlling the second version machine to simulate the at least one telephony service operation for the first telephony job, controlling the configuration controller to monitor active operational status of the actively performed at least one telephony service operation and simulated operational status of the simulated at least one telephony service operation, controlling the configuration controller to determine whether the simulated operational status satisfies a joining condition based on a comparison of the monitored simulated operational status with the monitored active operational status, and responsive to a determination that the simulated operational status satisfies the joining condition, controlling the configuration controller to transition configuration of the second version machine from the simulation configuration to the active configuration, such that the second version machine actively performs the at least one telephony service operation for the computing cluster while the first version machine continues to actively perform the at least one telephony service operation for the computing cluster.

* * * * *